(12) United States Patent
Berger et al.

(10) Patent No.: US 10,621,026 B2
(45) Date of Patent: Apr. 14, 2020

(54) AUTO BUG CAPTURE

(71) Applicant: Apple Inc., Cupertino, CA (US)

(72) Inventors: Henri S. Berger, Los Altos, CA (US); Eisuke Arai, San Jose, CA (US); Amit K. Vyas, San Jose, CA (US); David S. Choi, Cupertino, CA (US); Franco Travostino, San Jose, CA (US); Abhinav Pathak, Campbell, CA (US); Daniel Lertpratchya, Campbell, CA (US); Albert Liu, Sunnyvale, CA (US); Anand Ramadurai, Los Gatos, CA (US); Olivier Mardinian, Sunnyvale, CA (US); Vividh Siddha, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 92 days.

(21) Appl. No.: 15/648,427

(22) Filed: Jul. 12, 2017

(65) Prior Publication Data
US 2018/0349219 A1 Dec. 6, 2018

Related U.S. Application Data

(60) Provisional application No. 62/514,876, filed on Jun. 4, 2017.

(51) Int. Cl.
*G06F 11/00* (2006.01)
*G06F 11/07* (2006.01)

(52) U.S. Cl.
CPC ........ *G06F 11/079* (2013.01); *G06F 11/0751* (2013.01); *G06F 11/0769* (2013.01); *G06F 11/0784* (2013.01); *G06F 11/0787* (2013.01)

(58) Field of Classification Search
CPC ............. G06F 11/0751; G06F 11/0769; G06F 11/0787; G06F 11/079
See application file for complete search history.

(56) References Cited

U.S. PATENT DOCUMENTS 5,500,944 A * 3/1996 Yoshida ............ G06F 11/0748
714/39
6,782,345 B1 8/2004 Siegel
(Continued)

OTHER PUBLICATIONS

Technopedia, "Machine Learning," retrieved from https://www.technopedia.com/definition/1251/tuple-database, visited Mar. 6, 2019, 3 pages.
(Continued)

*Primary Examiner* — Joshua P Lottich
(74) *Attorney, Agent, or Firm* — Morgan, Lewis & Bockius LLP

(57) ABSTRACT

Some embodiments of the invention provide a novel architecture for debugging devices. This architecture includes numerous devices that without user intervention automatically detect and report bug events to a set of servers that aggregate and process the bug events. When a device detects a potential bug event, the device in some embodiments generates a description of the potential bug event, and sends the generated description to the server set through a network. In addition to generating such a description, the device in some embodiments directs one or more of its modules to gather and store a collection of one or more data sets that are relevant to the potential bug event, in case the event has to be further analyzed by the server set. In the discussion below, the generated bug-event description is referred to as the event signature, while the gathered collection of data sets for an event is referred to as the event's data archive. The server set aggregates and processes the bug-event signatures that it receives from the various devices. For only a subset of the reported bug-event signatures, the server set then directs the devices that sent these signatures to also send the data archives that these devices have gathered and stored for the events associated with these signatures. These data
(Continued)

archives can be further analyzed to identify the root causes of the bug events.

33 Claims, 18 Drawing Sheets

(56) References Cited

U.S. PATENT DOCUMENTS

| | | | |
|---|---|---|---|
| 8,793,664 B2 | 7/2014 | Joshi | |
| 9,122,791 B2 | 9/2015 | Burghard | |
| 9,413,893 B2 | 8/2016 | Hurst | |
| 10,019,305 B2 | 7/2018 | Aneja | |
| 2003/0126585 A1* | 7/2003 | Parry | G06F 11/0733 717/124 |
| 2006/0112304 A1* | 5/2006 | Subramanian | G06F 11/0727 714/6.11 |
| 2008/0046674 A1 | 2/2008 | Bernasconi | |
| 2008/0244316 A1* | 10/2008 | Gittins | G06F 11/0727 714/37 |
| 2009/0003345 A1 | 1/2009 | Chang | |
| 2009/0204636 A1 | 8/2009 | Li | |
| 2009/0300428 A1* | 12/2009 | Matsumoto | G06F 11/0709 714/47.1 |
| 2011/0154091 A1* | 6/2011 | Walton | G06F 11/0712 714/2 |
| 2012/0053901 A1* | 3/2012 | Arefeen | G05B 23/0213 702/183 |
| 2013/0152055 A1 | 6/2013 | Joshi | |
| 2013/0176133 A1 | 7/2013 | Phelps | |
| 2013/0246849 A1* | 9/2013 | Plamondon | G06F 11/3688 714/27 |
| 2014/0024348 A1 | 1/2014 | Hurst | |
| 2015/0095704 A1 | 4/2015 | Sokolik | |
| 2015/0309855 A1* | 10/2015 | Agnihotram | G06F 11/0793 714/37 |
| 2015/0347923 A1* | 12/2015 | Bartley | G06F 11/079 706/12 |
| 2016/0306691 A1 | 10/2016 | Aneja | |
| 2017/0076217 A1 | 3/2017 | Krumm | |
| 2018/0060159 A1 | 3/2018 | Justin | |
| 2018/0096261 A1 | 4/2018 | Chu | |
| 2018/0349218 A1 | 12/2018 | Berger | |
| 2018/0349219 A1 | 12/2018 | Berger | |

OTHER PUBLICATIONS

Technopedia, "Extensible Markup Language (XML)," retrieved from https://www.technopedia.com/definition/24387/extensible-markup-language-xml, visited Mar. 7, 2019, 3 pages.

Technopedia, "Tuple (Database)," retrieved from https://www.technopedia.com/definition/8181/machine-learning, visited Mar. 7, 2019, 4 pages.

* cited by examiner

Bug Capture Issues 800

○ Build  ● Device  ○ Domain  Type ▼  Subtype ▼

Type: [CPU] [Assertion] [Performance] [Operational] [Functional] [Energy]

[Click to Filter] 820

| Incidents | Devices | Process | Domain | Type | SubType | SubTypeContext | Impact | Available Logs | Reports |
|---|---|---|---|---|---|---|---|---|---|
| 52837 | 7882 | backboardd | Energy | Assertion | Leak | | 3%/hr | 23751 | 31258170 |
| 43541 | 3879 | syncdefaultd | Networking | Energy | Exc Connections Per Period | | | 25905 | 27000720 |
| 27199 | 283 | bird | Application | Functional | AssertionFailed | state == BRC_ITEM_STATE_LOST | | 706  855 | 31150876 |
| 24579 | 5102 | Baseband | Networking | Functional | Baseband Reset Missing Crash | modem reset: Resetting baseband after pushing files (due to kCarrierBundleChange) | | 5824 | 29755036 |
| 20301 | 1184 | racoon | Networking | Energy | Exc Connections Per Period | | | 11655 | 27657813 |
| 17369 | 2875 | com.apple.itunesstored | Application | Functional | passwordPrompt | | | 7870 | 31462011 |
| 16160 | 2200 | backupd | Energy | CPU | Short Term | pluggedIn | 1%/hr | 10059 | File Radar |
| 15526 | 851 | lockdown.intern | Networking | Energy | Exc Connections Per Period | | | 8244 | 27373840 |
| 13870 | 2755 | nsurlsessiond | Networking | Energy | Exc Connections Per Period | | | 6420 | 27266091 |
| 13284 | 3160 | assertiond | Energy | Assertion | Leak | | 3%/hr | 7562 | 32404634 |
| 11634 | 2031 | apsd | Energy | Assertion | Cumulative | | 3%/hr | 6764 | 27477542 |

*Figure 8*

| Device | Domain | Ty |
|---|---|---|
| ☐ Media Device OS 5,3 | | |
| ☐ Media Device OS 6,2 | | |
| ☐ Laptop OS 10,1 | | |
| ☐ Laptop OS 8,1 | | |
| ☐ Laptop Pro OS 10,1 | | |
| ☐ Laptop Pro OS 11,1 | | |
| ☐ Laptop Pro OS 11,2 | | |
| ☐ Laptop Pro OS 11,3 | | |
| ☐ Laptop Pro OS 11,4 | | |
| ☐ Laptop Pro OS 11,5 | | |
| ☐ Laptop Pro OS 12,1 | | |
| ☐ Laptop Pro OS 13,1 | | |
| ☐ Laptop Pro OS 13,2 | | |
| ☐ Laptop Pro OS 13,3 | | |
| ☐ Pro Computer OS 5,1 | | |
| ☐ Pro Computer OS 6,1 | | |
| ☐ Desktop OS 12,2 | | |
| ☐ Desktop OS 13,2 | | |
| ☐ Desktop OS 14,2 | | |
| ☐ Desktop OS 15,1 | | |
| ☐ Desktop OS 17,1 | | |
| ☐ Desktop OS 18,3 | | |
| ☐ Tablet OS 3,4 | | |
| ☐ Tablet OS 3,5 | | |
| ☐ Tablet OS 3,6 | | |
| ☐ Tablet OS 4,1 | | |

*1002*

| Domain | Type | Subtype |
|---|---|---|
| ☐ Energy | | |
| ☐ Networking | | |
| ☐ Application | | |
| ☐ Cloud Sync Services | | |
| ☐ Video Conferencing | | |
| ☐ Cellular | | |
| ☐ WiFi | | |
| ☐ Smart Home EcoSystem | | |
| ☐ Voice Assistant | | |
| ☐ Mail | | |
| ☐ Browsing | | |
| ☐ Mobile Browsing | | |
| ☐ Messaging | | |

*1004*

| Type | Subtype |
|---|---|
| Energy | |
| ☐ CPU | |
| ☐ Assertion | |
| Networking | |
| ☐ Performance | |
| ☐ Operational | |
| ☐ Functional | |
| ☐ Energy | |
| Application | |
| ☐ Functional | |
| Cloud Sync Services | |
| ☐ download Failure | |
| ☐ Discovery | |
| Cellular | |
| ☐ Baseband Stability | |
| ☐ IMS Call KPI | |
| ☐ IMS Reg | |
| ☐ Audio Quality | |
| ☐ Mobility | |
| ☐ VoLTE | |
| ☐ Data | |
| ☐ Data Stall | |
| ☐ CS Call KPI | |
| ☐ RRC | |
| ☐ RACH | |
| ☐ RAT Retention | |
| ☐ Roaming False Alarm | |
| WiFi | |
| ☐ IMS Call KPI | |
| ☐ IMS Reg | |

*1006*

| Type | Subtype |
|---|---|
| Assertion | |
| ☐ Long Assertion | |
| ☐ Total Assertion | |
| CPU | |
| ☐ Short Term | |
| ☐ Long Term | |
| Performance | |
| ☐ Data Stall | |
| ☐ TLS Handshake Failure | |
| ☐ DNS Resolution Failure | |
| ☐ SharePlay Connection Stalled | |
| Operational | |
| ☐ SYMPTOM_MBUF_PEAK_USAGE | |
| ☐ SYMPTOM_MBUF_HIGH_WATER_MARK | |
| ☐ SYMPTOM_RNF_EXCEEDED_NONSTOP | |
| ☐ Wi-Fi Assist Excessive Continued Stay | |
| Functional | |
| ☐ DHCP Address Acquisition Failed | |
| ☐ os_log error/fault pc | |
| ☐ os_log error/fault: assistantd pc | |
| Energy | |
| ☐ Excessive Connections Per Period | |
| ☐ Excessive Background Cell Duration | |
| ☐ Excessive Connections System Wide | |
| ☐ Background Activity Map Was Full | |
| Functional | |
| ☐ AssertionFailed | |
| ☐ passwordPrompt | |
| Discovery | |
| ☐ com.corp.sharingd.filedrop.discover.failed | |

Bug Capture Issues

○ Build  ○ Device  ○ Domain | Type ▼ | Subtype ▼ |                | Click to Filter |

Type: [CPU] [Assertion] [Performance] [Operational] [Functional] [Energy]

| Incidents | Devices | Process | Domain | Type | SubType | SubTypeContext | Impact | Available Logs | Reports |
|---|---|---|---|---|---|---|---|---|---|
| 52837 | 7882 | backboardd | Energy | Assertion | Leak | | 3%/hr | 23751 | 31258170 |
| 43541 | 3879 | syncdefaultd | Networking | Energy | Exc Connections Per Period | | | 25905 | 27000720 |
| 27199 | 283 | bird | Application | Functional | AssertionFailed | state == BRC_ITEM_STATE_LOST | | 706 | 31150876 |
| 24579 | 5102 | Baseband | Networking | Functional | Baseband Reset Missing Crash | modem reset: Resetting baseband after pushing files (due to kCarrierBundleChange) | | 5824 | 29755036 |
| 20301 | 1184 | racoon | Networking | Energy | Exc Connections Per Period | | | 11655 | 27657813 |
| 17369 | 2875 | com.apple.itunesstored | Application | Functional | passwordPrompt | | | | Open 27657813 / Get Logs |
| 16160 | 2200 | backupd | Energy | CPU | Short Term | pluggedIn | 1%/hr | | Delete report |
| 15526 | 851 | lockdown.intern | Networking | Energy | Exc Connections Per Period | | | | Auto-file new radar |
| 13870 | 2755 | nsurlsessiond | Networking | Energy | Exc Connections Per Period | | | | Add manual entry |
| 13284 | 3160 | assertiond | Energy | Assertion | Leak | | 3%/hr | | 1105 |
| 11634 | 2031 | apsd | Energy | Assertion | Cumulative | | 3%/hr | 6764 | 27477342 |

*Figure 11*

AUTO BUG CAPTURE

BACKGROUND

With the proliferation of smartphones, tablets, and smartwatches, the typical household today has numerous electronic devices performing numerous tasks. This proliferation had also led to a proliferation of the number of applications that execute on these devices and the numbers of application vendors. Bugs are a common occurrence on many of these devices, often because some of the applications are not developed properly. Also, when devices interact in an ecosystem, such interactions can cause additional unexpected bug events as it is often hard to account for all possible device interactions in all possible environments.

SUMMARY

Some embodiments of the invention provide a novel architecture for debugging devices. This architecture includes numerous devices that without user intervention automatically detect and report bug events to a set of servers that aggregate and process the bug events. The devices in some embodiments are different types of devices, such as smartphones, smartwatches, tablets, computers, media streaming devices, etc. In some embodiments, the operating systems of these devices (e.g., frameworks within the operating systems) perform the debugging operations on each device.

When a device detects a potential bug event, the device in some embodiments generates a description of the potential bug event, and sends the generated description to the server set through a network. In addition to generating such a description, the device in some embodiments directs one or more of its modules to gather and store a collection of one or more data sets that are relevant to the potential bug event, in case the event has to be further analyzed by the server set. In the discussion below, the generated bug-event description is referred to as the event signature, while the gathered collection of data sets for an event is referred to as the event's data archive.

The server set aggregates and processes the bug-event signatures that it receives from the various devices. For only a subset of the reported bug-event signatures, the server set then directs the devices that sent these signatures to also send the data archives that these devices have gathered and stored for the events associated with these signatures. These data archives can be further analyzed to identify the root causes of the bug events.

A bug event's data archive captures the state of the device as it relates to the bug event at the time that the bug event was detected. The event's data archive contains much more information than the event's signature, and this additional information can be used to identify a cause of the bug, when this cause is not discernable from an analysis of the signature. For instance, in some embodiments, the bug-event signatures are small structured files (e.g., JSON or XML files that are less than 100 KB) that the devices generate to describe the bug events in a lightweight format that can be easily uploaded to the server set at optimal times, e.g., in case of a mobile device, when the mobile device is being charged and has Wi-Fi connectivity.

The data archives, on the other hand, are a collection of unstructured data that can be very large (e.g., larger than 10s or 100s of megabytes) and can include a variety of different types of data, such as log files, databases, database dumps (i.e., data extractions from databases), network stack dumps (i.e., data extractions from network communication stacks), packet captures (i.e., logs of individual packets sent and received by the device), etc. A device can generate a data archive at the time that it detects a bug event, by duplicating files stored on the device and extracting data from databases or from network stacks operating on the device. In some embodiments, devices discard the data archives that they collect when the server set does not request these data archives within a certain duration of time after they were created.

In some embodiments, the server set parses and aggregates the generated bug-event signatures to produce presentations that allow users to view sorted lists of bug events in order to identify the subset of bug events for which the data archives have to be obtained. The server set in some of these embodiments also provides a user interface for viewing and analyzing the content of one or more collected data archives in order to identify the root cause of a bug event associated with the data archive(s). In other embodiments, the server set performs automated processes to analyze the signatures in order to identify in an automated manner the subset of bug events for which it needs data archives. Also, in other embodiments, the server set performs automated processes to analyze the content of the data archives to identify the root cause of the bug events.

In some embodiments, a device gathers data archives for all detected potential bug events. In other embodiments, the device gathers data archives only for a subset of detected bug events. Even when the device does not gather a data archive for a detected bug event, the device in some embodiments can send its generated event signature to the server set, so that the server set will have data about the occurrence of the detected event, which it can then aggregate with similar event data from other devices to identify the prevalence of these events. In such cases, the devices in some embodiments embed indicators in the bug-event signatures that specify that the devices have not generated data archives for the reported bug events. Alternatively, in other embodiments, the devices embed indicators in the bug-event signatures that identify the data archive(s) that the devices have generate for their signatures; in some of these embodiments, the absence of any identified data archive in an event signature provides an indication that no data archive was generated for an event signature. In some embodiments, the device does not send to the server set each bug-event signature that it generates, as the device filters out signatures based on a set of reporting criteria that it enforces.

In some embodiments, the device has one or more bug detecting modules (called bug detectors) that detect potential bug events and generate signatures for these events. The bug detectors in some embodiments identify a variety of bug events, such as bug events relating to energy consumption, network connectivity, device interoperability, application operation, cloud synchronizing services, video conferencing operations, cellular connections, Wi-Fi connectivity, voice assistant operations, mail operations, browsing operations, messaging operations, etc.

Each bug detector of the device supplies its bug-event signatures to an arbitration module (called the arbitrator) of the device. The arbitrator identifies each bug event for which the device has to generate a data archive, and directs the set of modules that have to generate the data archive to do so. In some embodiments, the arbitrator also selects a subset of the generated signatures for reporting to the server set for further analysis. In some embodiments, the bug detectors and the arbitrator perform their operations based on sets of rules that the server set can modify in order to adjust operations of these detectors and arbitrator. Also, in some embodiments, one or more bug detectors have machine-trained engines (e.g., neural networks) that detect anomalous conditions that should be identified as potential bug events. The arbitrator in some embodiments also has a machined-trained engine that it uses to identify the signatures to filter out and the data archives to collect.

In some embodiments, the interaction between the arbitration module and the bug detector is more involved than the bug detector simply providing bug event signatures to the arbitration module. For instance, in some embodiments, a bug detector and the arbitration module have a stateful interaction based on which the bug detector determines whether to generate a signature for a potential bug event. This stateful interaction is designed for a problem that may be currently developing for which the detector has not yet collected sufficient data to determine whether the problem is a potential bug event or not.

In such a case, the bug detector in some embodiments requests a session identifier from the arbitration module the moment the detector notices an event that might be a potential bug event. This session identifier specifies a monitoring session in which the bug detector and arbitration module analyze data collected by the bug detector to determine whether the identified event is a potential bug event. The request for the session identifier is part of a session request to the arbitration module.

In this request, the bug detector in some embodiments provides information about the event that it detects. Based on this information and based on other stateful data maintained by the arbitration module (e.g., based on previously detected bug events), the arbitration module might reject the session request (i.e., might filter out the detected event).

When the arbitration module does not reject the requested session, the arbitration module provides to the requested session identifier to the bug detector. The bug detector will then use this session identifier for all subsequent communication with the arbitration module regarding additional data that the detector collects and/or additional analysis that the detector performs. Before the bug detector determines that it has to generate a signature for the detected event, the arbitration module in some embodiments can direct the bug detector to end the session to filter out the detected event. While collecting data during a session, the detector in some embodiments might discard the event and terminate the session.

On the other hand, once the bug detector collects sufficient data to positively identify the detected event as a potential bug event, it ends the session, generates a bug event signature that stores diagnostic information about the bug event (e.g., in a structured JSON or XML format), and provides the bug event signature to the arbitration module. In some of these embodiments, the bug detector provides the session identifier along with the generated signature so that the arbitration module can associated the signature with the session, which it thereby terminates upon receiving the signature. A session can also terminate in some embodiments when a detector leaves a session open for too long (e.g., the arbitration module in some embodiments sets a session timer, which when it expires before the completion of the session, causes the arbitration module to terminate the session).

During the session, the arbitration module can direct an archive generator to start the process to collect data for a data archive that could be associated with an event signature, assuming that such a signature is eventually generated. In some embodiments, the bug detector directs the arbitration module to start generating a data archive, to collect certain data (e.g., certain log files), to raise log levels, and/or to stop the data archiving at a time identified by the detector.

In some embodiments, two or more devices can operate in tandem in one environment (e.g., in a home) to perform a set of tasks together. Certain bug events can occur because of the interactions between such devices. To address the reporting of such bug events, the debugging architecture of some embodiments allows a first device that detects a potential bug event in a multi-device ecosystem, to direct one or more other devices to gather a data archive that relates to a state of the second device as it pertains to the detected potential bug event. These other devices are called secondary devices in the discussion below as the perform they bug event operations at the behest of the first device, which is referred to as a master device. Each slave device can provide the data archive to the server set for further analysis. In some embodiments, the master and slave devices can be of the same type (e.g., two computers) or can be of different types (e.g., phone and watch).

In some embodiments, the master device also generates a data archive that relates to the master device's state as it pertains to the potential bug event, and provides this data archive to the server set. In some embodiments, the master and slave devices provide their data archives to the server set automatically without the server set requesting these data archives. In other embodiments, these devices provide these data archives only after the server set has requested them.

In some embodiments, the master and slave devices also generate event signatures that they send to the server set to describe the potential bug event, and the server set requests the data archives after processing these signatures. In some embodiments, the master device provides an identifier for the potential bug event to the slave device. The slave device uses this identifier to associate its event signature and/or event data archive with the event signature and/or event data archive that the master device generates. This identifier is a universal unique identifier (UUID) that the master device generates for the instance of the potential bug event that it detects. When the server set receives the event signatures and/or event data archives from the master and slave devices, it can use this unique identifier to associate the signatures and/or data archives that are collected from the two different devices. This association allows the two different data sets that are generated on the two different devices to be analyzed together to identify a root cause of a bug that is based on the interaction between the devices.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

FIG. 8 illustrates a debug dashboard of some embodiments.

FIGS. 9 and 10 illustrate examples of different search query parameters that can be expressed for each of the controls in the debug dashboard.

FIG. 11 illustrates a control for obtaining the data archives associated with a bug-event group.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel architecture for debugging devices. This architecture includes numerous devices that without user intervention automatically detect and report bug events to a set of servers that aggregate and process the bug events. As used in this document, a bug is any undesired or incorrect behavior on a device, which may be caused by a flaw or a failure in the code executed by the device, or the operation of any of the components of the device.

When a device detects a potential bug event, the device in some embodiments generates a description of the potential bug event, and sends the generated description to the server set through a network. In addition to generating such a description, the device in some embodiments gathers and stores a collection of one or more data sets that are relevant to the potential bug event, in case the event has to be further analyzed by the server set. In the discussion below, the generated bug-event description is referred to as the event signature, while the gathered collection of data sets for an event is referred to as the event's data archive.

The server set aggregates and processes the bug-event signatures that it receives from the various devices. For only a subset of the reported bug-event signatures, the server set then directs the devices that sent these signatures to also send the data archives that these devices have gathered and stored for the events associated with these signatures. In some embodiments, the server set provides a user interface for (1) viewing and analyzing the data retrieved from the signatures, in order to allow a user to identify data archives to collect, and (2) analyzing the collected data archives to identify the root cause of bug events. In other embodiments, the server set performs automated processes to analyze the data contained in the signatures to identify automatically the data archives to collect. Also, in some embodiments, the server set performs automated processes to analyze the collected data archives to identify the root cause of the bug events.

Figure 1:
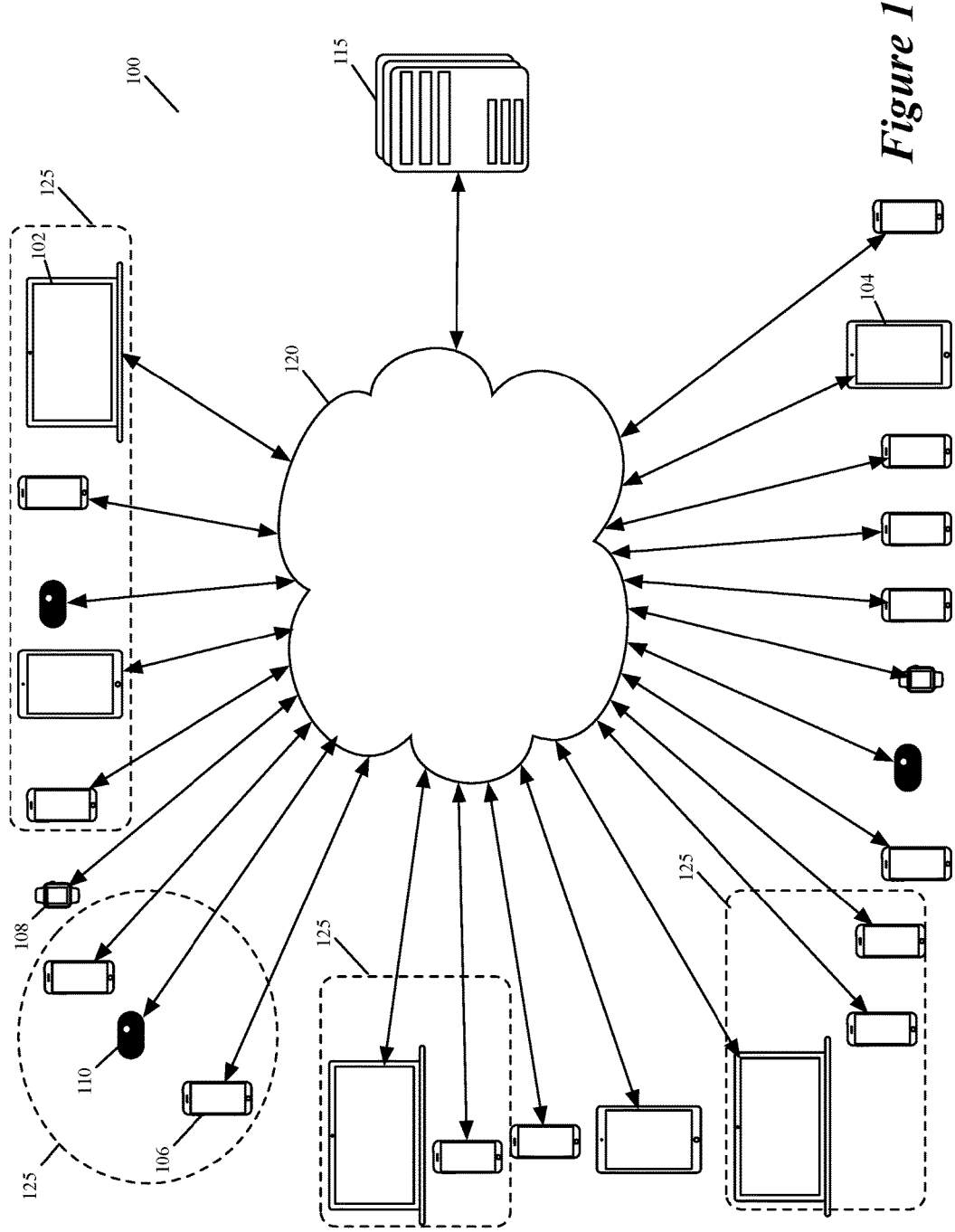
FIG. 1 illustrates a system that uses the debugging methodology of some embodiments.

FIG. 1 illustrates a system 100 that uses the debugging methodology of some embodiments. As shown, this system includes numerous devices 102-110 and a set of one or more debugging servers 115. The devices in this example include computers 102, tablets 104, smartphones 106, smartwatches 108, and streaming devices 110. These devices communicatively connect with the debugging server set 115 through a network 120. The network 120 can include one or more local area networks, one or more wide area networks, one or more wireless carrier networks and/or the Internet.

As shown, some of the devices 102-110 can operate in different multi-device ecosystems 125 (e.g., they can be associated with one user account and/or can be configured to interact with each other). Without user intervention, the devices 102-110 can automatically detect and report bug events to the server set 115 through the network 120. Specifically, each device can generate bug-event signatures and bug-event data archives, and can provide these signatures and data archives to the server set 115 through the network 120. In some embodiments, the devices can detect and report on a variety of different types of bugs, such as energy-consumption bugs, network-connectivity bugs, device-interoperability bugs, etc.

In some embodiments, the operating system (OS) of a device (e.g., a framework within the OS) performs the debugging operations on the device. Different type devices can have different operating systems, while devices of the same type can have different versions of the operating systems. Accordingly, in some embodiments, the debug server set 115 interacts with a myriad of different devices with different operating systems or different OS versions to collect the bug event data.

As further described below, the debugging server set 115 parses bug related data from the bug-event signatures, and stores the parsed data in databases that can be queried to identify any number of attributes related to these bugs.

Examples of attributes for which the databases can be queried in some embodiments include (1) different types of bugs that the devices encounter, (2) the number of occurrences of each bug or bug type identified along a number of dimensions (e.g., device type, OS, OS version, etc.), (3) the number of devices affected by each bug or bug type, (4) the frequency of occurrences of each bug or bug type identified along the number of dimensions, and (5) the data archives collected for each bug event or type.

In some embodiments, the server set 115 queries its databases to present bug event data in user interfaces that debug administrators can review to identify any bug related data that is aggregated and presented along any number of dimensions. In these or other embodiments, automated processes of the server set 115 to query its databases to automatically identify problematic bug events that need to be further explored. At the direction of debug administrators, or in response to the automated processing of the collected data, the server set 115 can direct the devices 102-110 to provide the data archives that they generated for certain bug events, and can provide these data archives to administrators or automated-processes for further analysis.

Figure 2:
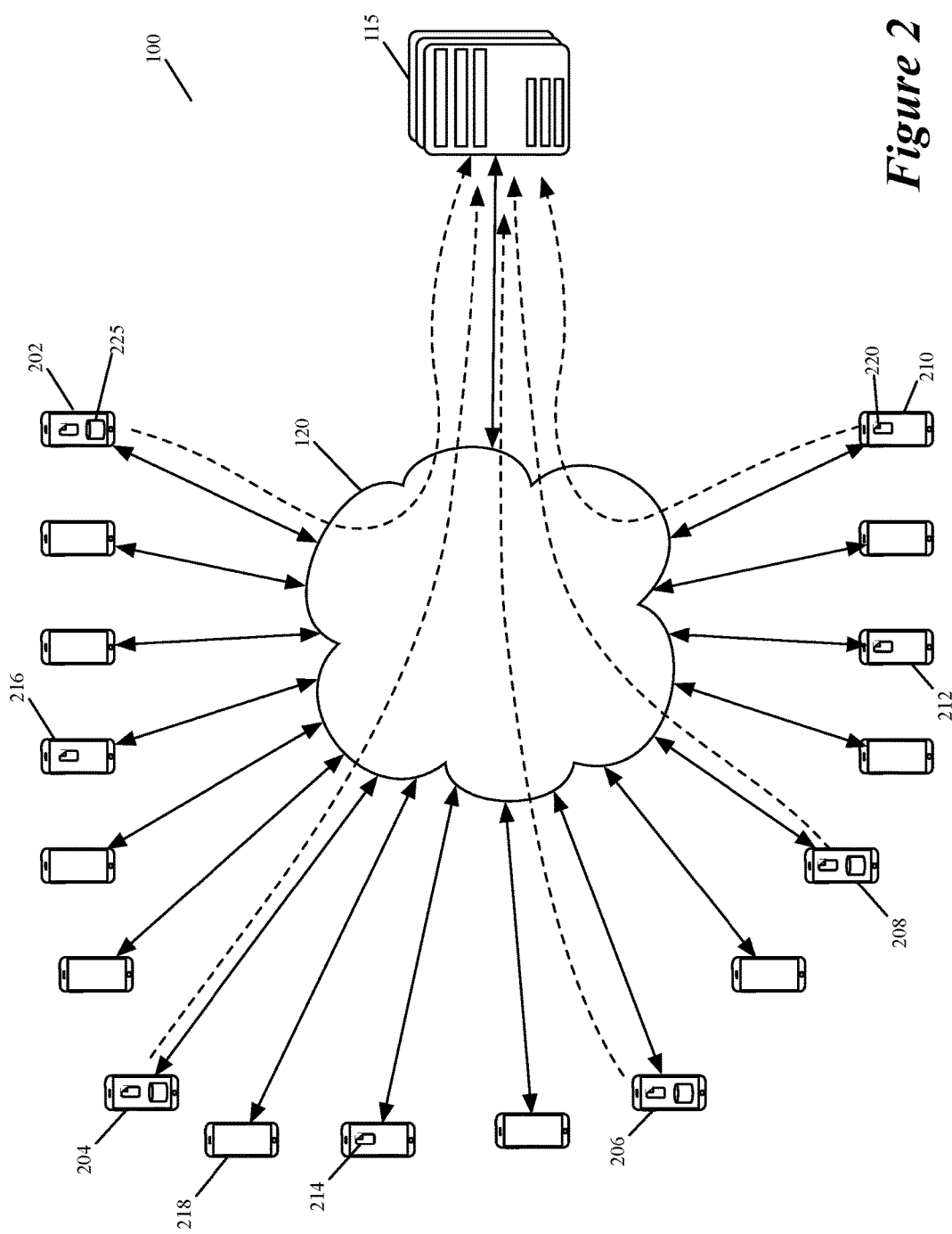
FIG. 2 illustrates an example of several devices detecting and reporting bug events during a period of time.

FIG. 2 illustrates an example of several devices detecting and reporting bug events during a period of time (e.g., on one day). To simplify the illustration in this figure, the devices are all shown to be smartphones. In this example, eight of the phones 202-216 detect potential bug events and generate bug-event signatures 220, while the other phones 218 do not detect any potential bug events during the time period depicted in this example. Of the eight phones 202-216 that detect bugs, five phones 202-210 send their generated event signatures to the server set 115 through the network 120. Also, of these eight, four phones 202-208 generate data archives 225 that capture the device state as it relates to the detected bug event at the time the bug was detected.

In this example, the devices 212-216 do not send their generated bug-event signatures to the server set 115. This illustrates that in some embodiments the devices do not send to the server set each bug-event signature that they generate, as the devices filter out signatures based on a set of reporting criteria that they enforce. Also, in this example, the device 210 does not generate a data archive for the bug-event signature that it generates and reports. This illustrates that in some embodiments the devices do not generate data archives for each event signature that they generate and report. However, even when a device (like device 210) does not gather a data archive for a detected bug event, the device can send its generated event signature to the server set, so that the server set will have data about the occurrence of the detected event, which it can then aggregated with similar event data from other devices. In some embodiments, a device embeds in a bug-event signature whether it will generate a data archive for the event, so that the server set can identify the events for which the devices have data archives.

A bug event's data archive 225 captures the state of the device as it relates to the bug event at the time that the bug event was detected. The event's data archive contains much more information than the event's signature, and this additional information can be used to identify a cause of the bug, when this cause is not discernable from an analysis of the signature. For instance, in some embodiments, the bug-event signatures 220 are small structured files (e.g., JSON or XML files that are less than 100 KB) that the devices generate to describe the bug events in a lightweight format that can be easily uploaded to the server set at optimal times, e.g., in case of a mobile device, when the mobile device is being charged and has Wi-Fi connectivity.

The data archives 225, on the other hand, are a collection of unstructured data that can be very large (e.g., larger than 10s or 100s of megabytes) and can include a variety of different types of data, such as log files, databases, database dumps (i.e., data extractions from databases), network stack dumps (i.e., data extractions from network communication stacks), packet captures (i.e., logs of individual packets sent and received by the device), etc. Several examples of bug-event signatures and their associated data archives will be further explained below.

A device can generate a data archive at the time that it detects a bug event, by duplicating files stored on the device, extracting data from one or more data storages (e.g., databases) on the device, or from network stacks operating on the device. In some embodiments, devices discard the data archives that they collect when the server set does not request these data archives within a certain amount of duration after they were created.

The server set 115 in the example of FIG. 2 will extract the data from the reported bug-event signatures. The server set 115 then analyzes this data, or make this data available for a debug administrators to analyze through a user interface. The server set can then direct one or more of the devices 102-108 that generated data archives for their detected bugs to send these data archives to the server set for further analysis. These server set operations will be further described below by reference to FIGS. 5-12.

Figure 3:
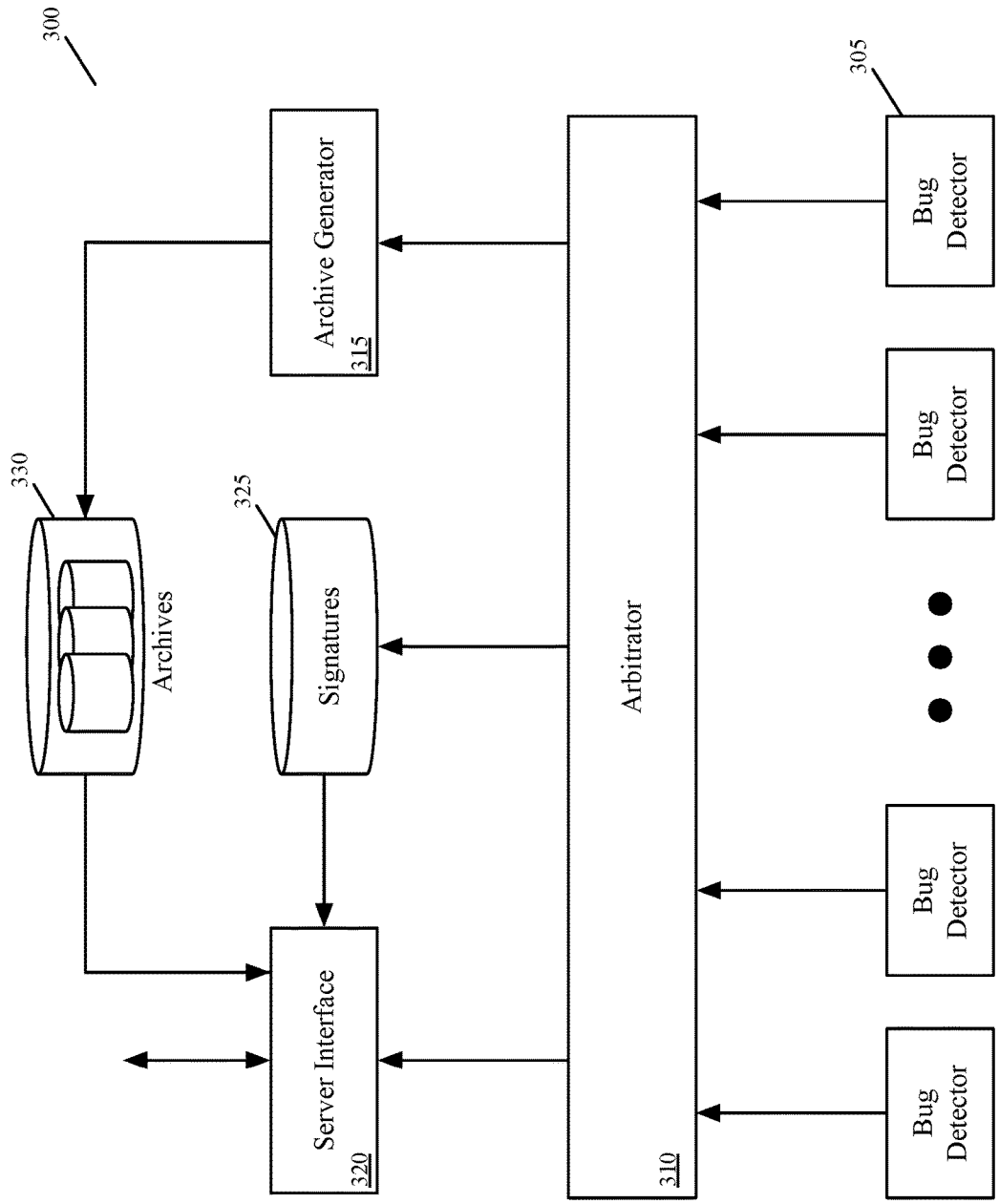
FIG. 3 illustrates a debug module of a device, such as the devices in FIG. 1 and FIG. 2.

FIG. 3 illustrates a debug module 300 of a device, such as the devices 102-110 of FIG. 1 or the devices 202-218 of FIG. 2. In some embodiments, the debug module 300 is part of a debug framework of the operating system of these devices. As shown, the debug module 300 includes several bug detectors 305, an arbitrator 310, a data archive generator 315 and a server set interface 320.

The bug detectors 305 are bug-detecting modules that detect potential bug events and generate signatures for these events. The bug detectors in some embodiments identify a variety of bug events, such as bug events relating to energy consumption, network connectivity, device interoperability, application operation, cloud synchronizing services, video conferencing operations, cellular connections, Wi-Fi connectivity, voice assistant operations, mail operations, browsing operations, messaging operations, etc. In some embodiments, a bug detector performs its operations based on sets of rules that the server set can modify in order to adjust operations of this detector. Also, in some embodiments, one or more bug detectors rely on machine-trained engines (e.g., neural networks) to detect anomalous conditions that might be potential bug events.

Each bug detector of the device supplies its bug-event signatures to the arbitrator 310. The arbitrator is an arbitration module that analyzes the bug-event signatures that it receives to identify (1) the bug-event signatures that should be reported to the server set 115 (i.e., the bug events that need to be reported to the server set), (2) the bug-event signatures that should be discarded (i.e., filtered out), and (3) the bug-event signatures for which data archives need to be generated. The arbitrator 310 stores the signatures that should be reported to the server set in the signature data store 325, from where the server interface 320 retrieves them and send them to the server set at optimal times, e.g., in case of a mobile device, when the mobile device is being charged and has Wi-Fi connectivity.

In some embodiments, the arbitrator has a rule engine that performs its arbitration operations based on sets of rules that direct the arbitrator's signature-filtering, signature-reporting and data archiving operations. In some of these embodiments, the server set can modify these rules in order to adjust the operations of the arbitrator. The arbitrator in some embodiments also has a machined-trained engine that it uses to identify the signatures to filter out and the data archives to collect.

When the arbitrator selects a bug event as an event for which a data archive has to be generated, it directs the data archive generator 315 to generate a data archive for the event, and store this data archives in the data archive data store 330, from where the server interface 320 can retrieve the data archive and send it to the server set upon the server set's request. In some embodiments, the arbitrator 310 provides the event signature UUID (universal unique identifier) to the data archive generator so that this generator can associate the generated data archive with its corresponding event signature.

In some embodiments, the interaction between the arbitrator 310 and a bug detector 305 can be more involved than the bug detector simply providing bug event signatures to the arbitrator. For instance, in some embodiments, a bug detector 305 and the arbitrator have a stateful interaction based on which the bug detector determines whether to generate a signature for a potential bug event. This stateful interaction is designed for a problem that may be currently developing for which the detector has not yet collected sufficient data to determine whether the problem is a potential bug event or not.

In such a case, the bug detector 305 in some embodiments requests a session identifier from the arbitrator 310 the moment the detector notices an event that might be a potential bug event. This session identifier specifies a monitoring session in which the bug detector and arbitrator analyze data collected by the bug detector to determine whether the identified event is a potential bug event. The request for the session identifier is part of a session request to the arbitrator.

In this request, the bug detector in some embodiments provides information about the event that it detects. Based on this information and based on other stateful data maintained by the arbitrator (e.g., based on previously detected bug events), the arbitrator 310 might reject the session request (i.e., might filter out the detected event).

When the arbitrator does not reject the requested session, the arbitrator 310 provides to the requested session identifier to the bug detector. The bug detector will then use this session identifier for all subsequent communication with the arbitrator regarding additional data that the detector collects and/or additional analysis that the detector performs. Before the bug detector determines that it has to generate a signature for the detected event, the arbitrator in some embodiments can direct the bug detector to end the session to filter out the detected event. While collecting data during a session, the detector in some embodiments might discard the event and terminate the session.

On the other hand, once the bug detector collects sufficient data to positively identify the detected event as a potential bug event, it ends the session, generates a bug event signature that stores diagnostic information about the bug event (e.g., in a structured JSON or XML format), and provides the bug event signature to the arbitrator. In some of these embodiments, the bug detector provides the session identifier along with the generated signature so that the arbitrator can associated the signature with the session, which it thereby terminates upon receiving the signature. A session can also terminate in some embodiments when a detector leaves a session open for too long (e.g., the arbitrator in some embodiments sets a session timer, which when it expires before the completion of the session, causes the arbitrator to terminate the session).

During the session, the arbitrator 310 can direct the archive generator 315 to start the process to collect data for a data archive that could be associated with an event signature, assuming that such a signature is eventually generated. In some embodiments, the bug detector directs the arbitrator to start generating a data archive, to collect certain data (e.g., certain log files), to raise log levels, and/or to stop the data archiving at a time identified by the detector.

As mentioned above, the server set 115 in some embodiments can dynamically adjust the sets of rules that one or more bug detectors 305 and the arbitrator 310 use to perform their operations. Adjusting the arbitrators rules is beneficial in that it allows the server set to direct the arbitrator to filter out more of certain bug types, and/or to report more of other bug types. Also, by adjusting the rules of a bug detector 305, the server set can "tune" the detector to identify new and/or different bug patterns. This is particularly useful for capturing transient bug conditions (e.g., mobile devices of one mobile carrier in a particular city or area are experiencing a high call drop rates and the server set wants to identify the root cause of the dropped calls). In some embodiments, the server set can also deploy one or more new bug detectors 305 within the debug module 300 of a device in some embodiments. This further enhances the bug capturing capabilities of the debug system 100 to cope with bug patterns that are discovered after a device starts to operate within the debug system's ecosystem.

The data archive generator directs one or more modules executing on its device to provide data relating to the detected bug event for the generator to include in that event's data archive. For instance, the data archive generator can interact with a local database or local network stack to extract data contained in the database or network stack that is associated with a detected bug event. It can then store the extracted data in a data storage (e.g., file, database, etc.) that will be part of the event data archive's collection of data. The data archive generator can also direct the local file system to copy a set of files, and the generator can then include these copies in the event data archive.

In some embodiments, the data archive generator has a rule engine that processes different sets of rules for data archiving different types of bug events (e.g., one set of rules for collecting data regarding energy-consumption bug events, another set of rules for collecting network bug events, etc.). In some embodiments, the server set can modify these rules to modify the archiving operations of the devices.

The server interface 320 handles the communication with the server set 115 through the network 120. In some embodiments, the server interface communicates with a set of webservers of the server set 115. As such, the server interface 320 and server set 115 use standard web based communication protocols (e.g., layer 3 IP communication, layer 4 TCP/UDP communication, etc.) to pass along signatures, data archive requests, data archives, and other communications between the devices and server set 115.

As mentioned above, the server interface 320 sends the signatures stored in the signature data store 325 to the server set 115 at optimal times. Similarly, after receiving a data archive request from the server set 115, the server interface 320 in some embodiments sends the requested data archive to the server set at an optimal time. Specifically, in some cases, the server interface 320 does not send the data archive after receiving the server set's data archive request if the server interface determines that the time at which it received the request is not an optimal time for reporting the data archive.

Some embodiments define the optimal time for reporting a signature or a data archive differently for different devices. For instance, for some or all of the devices, some embodiments require the device to be connected to a local area network (e.g., a Wi-Fi network connection) instead of a wireless carrier network, before it can even consider sending bug-event signature(s) and/or data archive(s). These embodiments prefer local area network (such as Wi-Fi connections) over carrier networks because such connections typically consume less power and do not have associated data limits. However, in case of urgency or other considerations, some embodiments allow the devices to send bug-event signatures through the carrier network. Also, in some embodiments, the signature and/or archive reporting cannot conflict with other tasks being currently performed by the device. Accordingly, the server interface 320 in some embodiments does not report signature(s) and/or data archive(s) to the server set 115 when the device's computation resources (e.g., its CPU or memory) are being consumed by other higher priority tasks.

Figure 4:
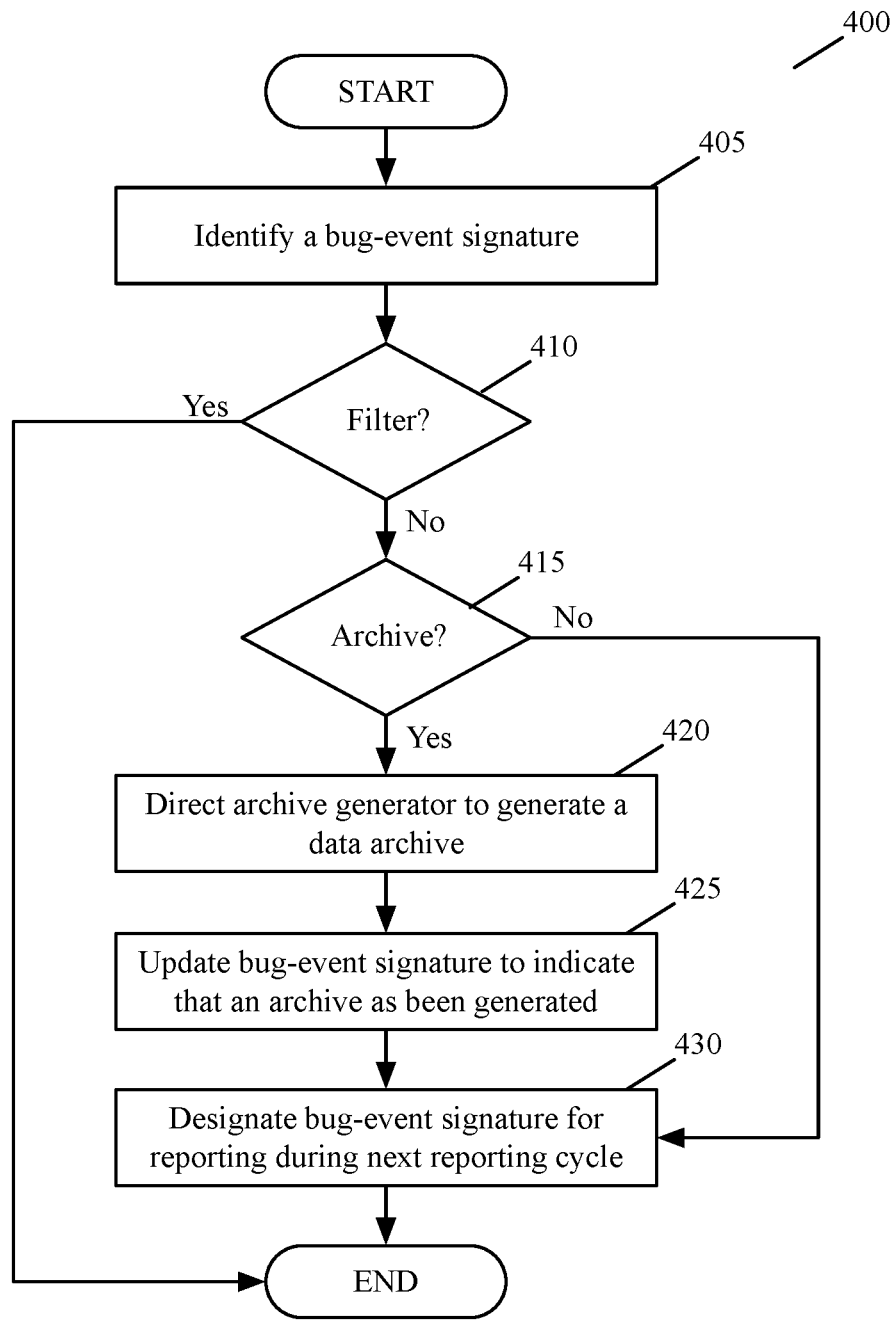
FIG. 4 illustrates a process that the arbitrator performs in some embodiments for a bug-event signature that it receives.

FIG. 4 illustrates a process 400 that the arbitrator 310 performs in some embodiments for a bug-event signature that it receives. As shown, the arbitration process 400 initially identifies (at 405) a bug-event signature. In some embodiments, the arbitrator 310 performs this process each time that it gets a signature from a bug detector 305 for a detected bug event. Hence, in these embodiments, the signature identified at 405 is a signature that the arbitrator receives from a bug detector 305. As mentioned above, the arbitrator 310 might engage in a stateful interaction with a bug detector in some embodiments, before the arbitrator receives a bug event signature from that detector.

At 410, the process determines whether it should discard the signature without reporting it to the server set 115. In some embodiments, the process 400 performs this filtering operation based on a set of reporting rules that direct how the arbitrator 310 reports bug-event signatures to the server set. For instance, in some embodiments, the reporting rules specify a maximum number of signatures that the arbitrator should report to the server set in a given time period (e.g., in a day). In other embodiments, the reporting rules specify different maximum numbers of signatures (that the arbitrator should report to the server set during a given time period) for different types of bugs (e.g., one maximum number of energy-bug signatures and another maximum number of network-bug signatures). In still other embodiments, the reporting rules specify maximum reporting percentages, so that the server set will get more signatures for the bug types that more commonly occur within a given period of time.

When the process determines (at 410) that it should filter out the identified signature, it discards this signature without reporting it to the server set 115, and then ends. Otherwise, when the process determines (at 410) that is should report the signature, the process determines (at 415) whether a data archive should be generated for the bug event associated with the signature. As mentioned above, the arbitrator reports a subset of signatures in some embodiments without having data archives generated for the events associated with these signatures. This is because the generation of such data archives consumes resources of the device (e.g., computational resources, energy resources, storage resources, etc.).

In some embodiments, the process 400 uses a set of data archiving rules to select the bug-event signatures for which it has to direct the data archive generator 315 to generate a data archive. For instance, in some embodiments, the archiving rules specify a maximum number of signatures for which the device should generate data archives in a given time period (e.g., in a day). In other embodiments, the data archiving rules specify different maximum numbers of signatures (for which data archives should be generated) for different types of bugs (e.g., one maximum number of energy-bug signatures and another maximum number of network-bug signatures). In still other embodiments, the archiving rules specify other criteria to select the signatures for which data archives have to be generated.

When the process determines (at 415) that a data archive should not be generated for the identified signature, the process transitions to 430, which will be further described below. On the other hand, when the process determines (at 415) that a data archive should be generated, it directs (at 420) the data archive generator 315 to gather one or more data collections associated with the bug event specified in the identified signature, and to associate the collected data with a data archive data structure. As mentioned above, the arbitrator 310 in some embodiments can direct the archive generator 315 to start generating a data archive for an event, before the arbitrator receives the bug-event signature from a bug detector. This would be the case when the bug detector directs the arbitrator to start the archive generation during the stateful interaction between the arbitrator and the detector that occurs before the detector generates the signature for the detected bug event. In some embodiments, the arbitrator 310 engages in the stateful interaction with the bug detector and/or starts the archive generation before receiving the bug event signatures for only a subset of bug events and not all bug events from all the bug detectors.

After 420, the process updates (at 425) the bug-event signature to indicate that a data archive has been generated for this signature. In some embodiments, this involves defining a Boolean value in the signature's file (e.g., setting a value in the JSON or XML signature file) to True to indicate that a data archive has been generated. In other embodiments, the signatures have the data archive value set to True, and the arbitrator sets this value to False when it decides not to generate a data archive for a signature. In still other embodiments, the arbitrator provides outside of the signatures an indication to the server set 115 of whether data archives were for a signature.

After 425, the process transitions to 430. At 430, the process designated the bug-event signature for reporting to the server set 115. In some embodiments, the server interface 320 reports the report-designated signatures to the server set at optimal times and in batch in order to conserve the resources of the device. For example, when the device is a mobile device, the server interface 320 reports the report-designated signatures while the mobile device is connected to a Wi-Fi network and a charger. This ensures that the signature reporting does not consume the mobile device's battery, and potentially limited network usage allotment. After 430, the process 400 ends.

Figure 5:
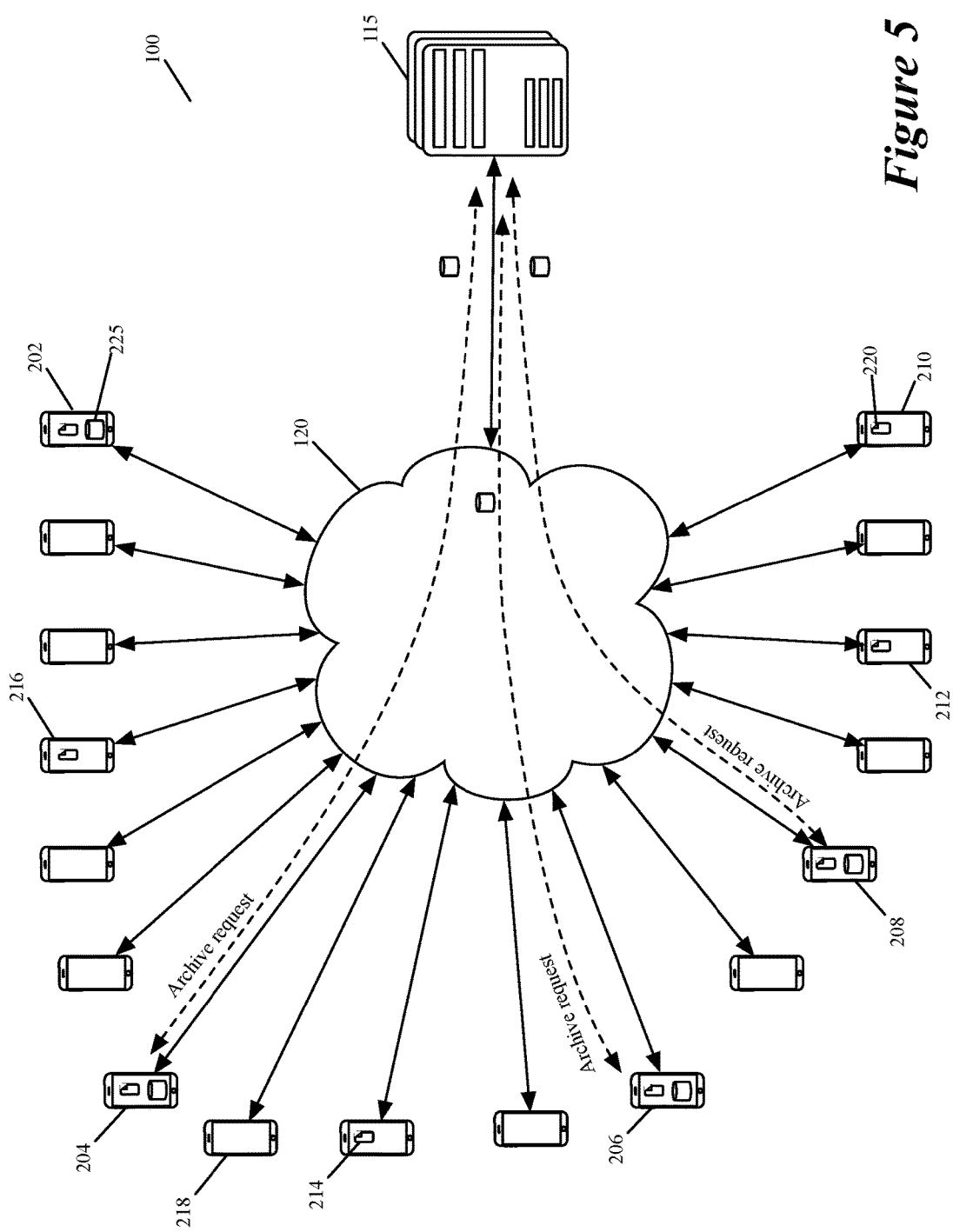
FIG. 5 illustrates the server set directing three of the signature-generating devices to provide the data archives that they generated for the signatures that they reported to the server set.

As mentioned above, the server set 115 parses the data from the bug-event signatures that it receives, and stores this data in its databases. These databases can then be queried to retrieve, aggregate, view and/or analyze bug-event data. Based on these operations, the server set 115 can then direct one or more devices that provided the bug-event signature to also provide the data archives that they gathered and stored for the events associated with these signatures. For the example illustrated in FIG. 2, FIG. 5 illustrates the server set 115 directing three of the signature-generating devices 204, 206, and 208 to provide the data archives that they generated for the signatures that they reported to the server set. It also shows the server set collecting these three data archives.

Figure 6:
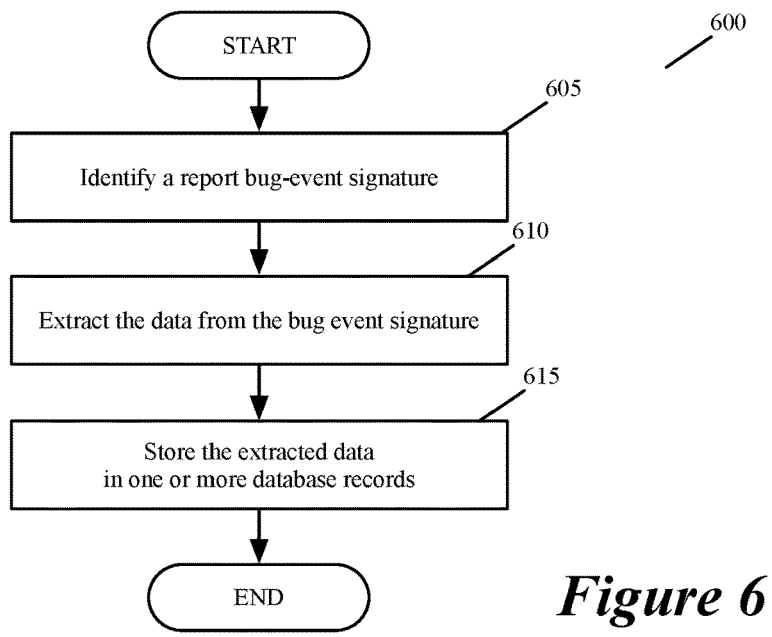
FIG. 6 illustrates a process that the server set performs to process a bug-event signature.

FIG. 6 illustrates a process 600 that the server set 115 performs to process a bug-event signature. In some embodiments, the server set 115 processes bug events in real-time as it receives them, while in other embodiments the server set processes the bug events in batch. As shown, the process initially identifies (at 605) the bug-event signature to process. Next, at 610, the process extracts the data from the bug event signature. As mentioned above, the bug-event signatures are in structured files, such as XML files or JSON files. In some embodiments, the server set has data parsers that extract data from such files.

At 615, the process 600 stores the extracted data in one or more database records that can be queried to collect, aggregate, process and/or present data about the detected bug events. Bug-event signatures can provide a lot of data regarding the detected bug events and the devices on which the bug events were detected. Examples of such data include device identifiers, device types, device OS ID, time of day, bug ID type, ID of any process associated with the bug event, etc. In some embodiments, the server set stores each bug's extracted data attributes in one table record that can reference other records of other tables, e.g., device type records, etc. In other embodiments, the server set stores each bug's extracted data attributes in multiple records of multiple tables, with an association between these records and between records of other tables. Also, in some embodiments, the server set stores the extracted data of different types of bug events in different tables, while in other embodiments, the server set does not have different tables for different bug event types. After 615, the process ends.

Figure 7:
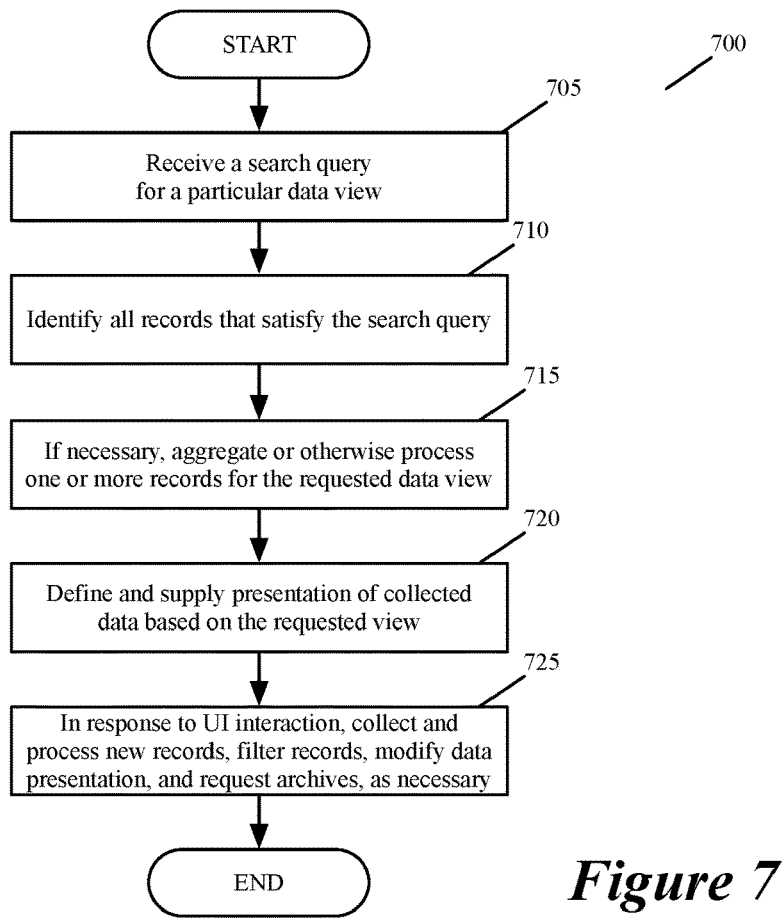
FIG. 7 illustrates a process that the server set performs in some embodiments to process queries to the database in which it stores extracted bug-signature data.

FIG. 7 illustrates a process 700 that the server set 115 performs in some embodiments to process queries to the database in which it stores extracted bug-signature data. In some embodiments, the server set 115 can process such search queries from its web servers that provide UI presentations of the captured bug data, or it can process such queries from automated processes that analyze captured bug event data in an automated manner to identify the data archives to collect or to otherwise analyze the bug events. In the example illustrated in FIG. 7, the search queries are for presenting the bug-event data in a debug UI display presentation, referred to below as a debug UI dashboard. Examples of this dashboard will be described below by reference to FIGS. 8-11.

As shown, the process 700 initially receives (at 705) a search query that identifies a set of one or more attributes for a set of one or more fields of the database. This search query is received along with a particular data view that is being requested for display in the debug UI dashboard. At 710, the process identifies all records in its database that satisfy the search query (i.e., that have field values that match the search query attributes).

Next, at 715, the process determines whether for the requested view it needs to aggregate or otherwise process the data in one or more records identified at 710, and if so, it aggregates/processes the identified data. For instance, in some embodiments, an debug dashboard's data view can aggregate the data for similar bug event types in order to identify the most problematic or frequent bug types that occur on a particular device type, a particular OS type, or a particular OS build. Examples of such aggregation will be further described below by reference to FIGS. 8-11.

At 720, the process defines a display presentation of the collected and processed, database data, and supplies this presentation to a webserver of the server set 115 for display in the debug dashboard. In some embodiments, the debug dashboard is presented in a web browser of a device (e.g., desktop or laptop computer, tablet, smartphone, etc.) that a debug administrator uses to view the bug data. Hence, in these embodiments, the display presentation is a web-browser presentation that is generated for display by a browser.

At 725, the process serially receives one or more requests from the debug administrator through the debug dashboard to modify the displayed presentation of data (e.g., to present a different data presentation view), to filter the displayed presentation based on one or more additional search query parameters, and to identify new data records to retrieve and process form the database. Also, one or more of these requests can direct the server set to collect one or more data archives for one or more of bug-event types or bug events that are identified in the dashboard's presentation. In response to such requests, the server set directs one or more devices to provide the data archives that they gathered for their reported bug-event signatures. In some embodiments, when the administrator only requests that data archives for a particular bug type should be collected, the server set uses a set of collection rules to identify on its own one or more devices that reported bug events of this type and directs these devices to provide their data archives for these reported bug events. The process 700 ends (after 725) once the user closes the dashboard.

FIG. 8 illustrates a debug dashboard 800 of some embodiments. As shown, this dashboard has (1) one set of controls 802-814 for specifying a query for retrieving bug-event data from the server set's database, and (2) a display area 820 for displaying the results of a search query. The control 812 provides a field for specifying a name of a process that might be associated with reported bug-event signatures. This field allows the user to search for particular processes to determine if they are associated with reported bugs on the monitored devices. The control 814 can be selected to direct the server set to formulate a search query based on the parameters specified through controls 802-812, to retrieve records from its database, and to create presentations for displaying the matching bug data in the display area 820.

As shown, the set of controls include a control 802 for specifying an OS version (i.e., an OS build), a device control 804 for specifying a type of device, a domain control 806 for specifying a bug-event domain (which in some embodiment are managed by different debug administrators), a bug type control 808 for specifying the type of bug of interest, and a bug sub-type control 810 for specifying a sub-type for each bug event type of interest.

Figure 9:
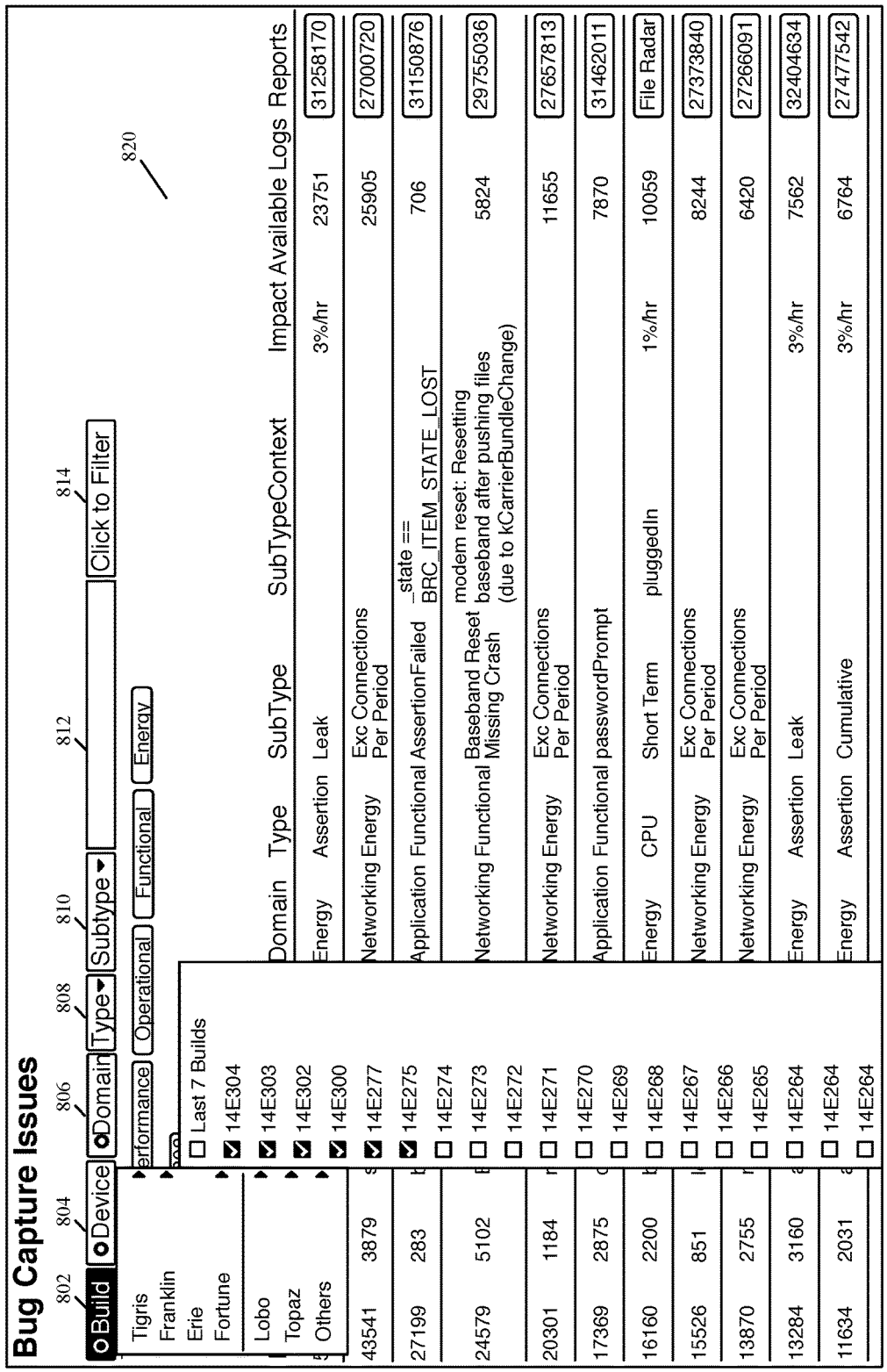

FIGS. 9 and 10 illustrate examples of different search query parameters that can be expressed for each of these controls. As shown by these examples, the controls 802-810 are implemented as drop-down menus, with each menu presenting several parameters as selectable of checkboxes. FIG. 9 shows the drop-down menu 802 opened over the display area 820, while FIG. 10 only shows the opened drop-down menus 804-810 on their own for sake of simplifying the figures. One of ordinary skill will realize that these controls 802-810 can have a myriad of other UI implementations, e.g., scrollable boxes in which different parameters highlighted once they have been selected. Irrespective of the UI implementation, multiple parameters can be selected in each menu item in some embodiments.

As shown in FIG. 9, the OS build control 802 allows a user to select multiple operating systems for multiple device types, and to select multiple different versions of the same or different operating system. This figure also shows the selection of multiple different versions of an operating system. This is one example that shows that multiple parameters can be selected in each control menu item 802-810 in some embodiments.

The device control 804 provides a list of different devices and different versions of the same device, as shown in the drop down menu 1002 of FIG. 10. Drop down menu 1004 of this figure lists the different domains that can be selected in some embodiments. The presented choices include energy, networking, application, cloud synchronizing services, video conferencing, cellular, Wi-Fi, smart home ecosystem, voice assistant, mail, browsing, mobile browsing and messaging.

The third and fourth drop-down windows 1006 and 1008 of FIG. 10 illustrate some of the selectable type and sub-type parameters that are available in the distributed debug architecture of some embodiments. As shown, the type drop-down window 1006 present energy, networking, application, cellular, and Wi-Fi as some of the selectable bug types. This window further allows each of these types to be further defined. For instance, the energy type can be specified as a CPU energy type or an assertion energy type, while the network type can be specified as performance, operational, functional and energy types. The sub-type window 1008 allows sub-types to be selected for the bug types listed in the type window 1006. For instance, Long Assertion and Total Assertion are two sub-types for the assertion energy bug type, while Short Term and Long Term are two sub-types for the CPU energy bug type.

FIG. 8 illustrates one example of a bug-data presentation in the display area 820. This presentation is in a table format, but one of ordinary skill will realize that the bug data can be presented in other formats in some embodiments. In the presentation of FIG. 8, the search query, which was used to retrieve the presented bug events, is a query for all bug events associated with one of the following event types: CPU, Assertion, Performance, Operational, Functional and Energy. Also, in this presentation, the bug events are grouped first by their corresponding associated process that is identified in the third column 836, and then by their types and sub-types in the fifth and sixth columns 840 and 842. For each group, the presentation provides a total number of detected incidents and a total number of affected devices in the first and second columns 830 and 832.

The fourth column 838 of the bug-data presentation identifies the bug domain for each bug event group. The seventh column 844 identifies the sub-type context, that indicates contextual information such as whether the device was plugged in or not. The eighth column 846 provides an impact factor for each bug event group (e.g., quantifies the reduction in battery efficiency caused by the bug). For each bug event group, the ninth column 848 identifies the number of data archives collected for the bug events. As shown, the number of data archives is less than the total number of incidents reports for each group of bug events as data archives are not generated for each reported bug event.

The tenth column 850 of the bug-data presentation provides a control 855 that indicates whether a report has been created for each bug event group. If so, this column displays a report number for the bug event. When no report has been created for a bug-event group, the control 855 displays a "File Report" note. In this case, selection of this control directs the server set to create a report, and generate a report number for this report.

When a report has been created and a report number has been assigned, the selection of the control 855 opens a window 1105 that provides a control 1110 for obtaining the data archives associated with the bug-event group, as shown in FIG. 11. Selection of this control 1110 directs the server set to select a subset of devices that (1) provided bug-event signatures for the bug-event group associated with the selected control 1110, and (2) generated data archives for these signatures. The server set then directs these selected devices to provide their data archives for these signatures. FIG. 11 also shows that the window 1105 includes other controls for performing other operations with respect to the bug-event report associated with this window's control 1110. These operations include deleting the bug-event report and adding manual comments regarding the bug-event group.

The examples illustrated in FIGS. 8, 9 and 11 display only one bug-event data view. In some embodiments, the dashboard 800 allows the user to modify the data view presented in the display area 820. For instance, in some embodiments, the user can add or remove the columns that are displayed in each presentation, and/or can modify how the bug-event data is grouped. In the example illustrated in FIG. 8, the user in some embodiments can remove the sub-type column 842 or another column. Also, instead of using the process identifier, the user can have the bug-event data to be grouped based on another grouping criteria. The modification to the presentation view can modify how the server set aggregates the data records that it retrieves from its database.

Figure 12:
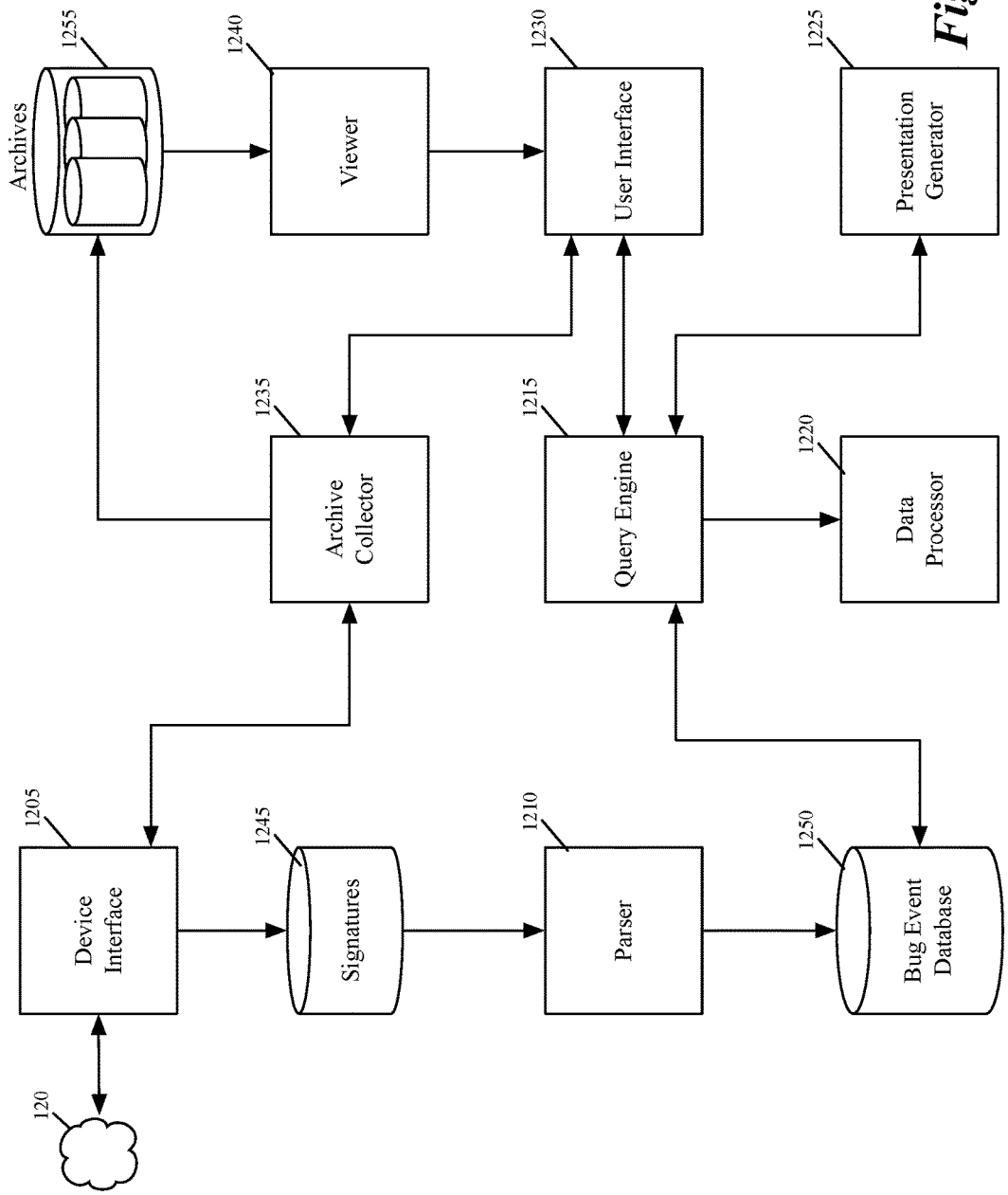
FIG. 12 illustrates the software architecture of the server set of some embodiments.

FIG. 12 illustrates the software architecture 1200 of the server set 115 of some embodiments. The modules in this architecture can execute on one machine (e.g., one computer, one virtual machine, one container, etc.), or they can execute on multiple machines (e.g., multiple computers, multiple virtual machines, multiple containers, etc.). As shown, these modules include a device interface 1205, a parser 1210, a query engine 1215, a data processor 1220, a presentation generator 1225, a user interface module 1230, a data archive collector 1235, and a viewer 1240. The server set also includes three sets of storages, which are the signature data storage 1245, the bug-event database 1250 and a data archive data store 1255.

The device interface 1205 handles the communication with the devices through the network 120. In some embodiments, the device interface includes a set of webservers that communicate with the devices through standard web based communication protocols (e.g., layer 3 IP communication, layer 4 TCP/UDP communication, etc.) to collect signatures, to send data archive requests, to collect data archives, and to handle other communications with the devices.

The device interface 1205 stores received signatures in the signature data store 1245. The parser 1210 retrieves each signature from this data store 1245, and extracts the data from the signature. The parser is an XML or JSON parser in some embodiments that can extract the data from XML or JSON signature files. The parser stores the data that it extract from a signature in one or more records of the bug event database 1250, which can be queried to collect, aggregate, process and/or present data about the detected bug events. In some embodiments, the parser stores each bug's extracted data attributes in one table record that can reference other records of other tables. In other embodiments, the parser stores each bug's extracted data attributes in multiple records of multiple associated tables, which can also be associated with records of other tables. Also, in some embodiments, the parser stores the extracted data of different types of bug events in different tables.

The user interface module 1230 handles interactions with the user through the debug dashboard. As mentioned above, a user can specify one or more search parameters for a search query through one or more controls (such as controls 802-814 of the dashboard of FIG. 8). The query engine 1215 receives such a search query from the UI module 1230. With the search query, the UI module 1230 specifies a particular view of the data in some embodiments. In other embodiments, the particular view of the data is resolved at the devices after receiving the results of a search query.

Using the search parameters of the received search query, the query engine identifies all records in the bug-event database 1250 that satisfy the search query (i.e., that have field values that match the search query attributes). The query engine 1215 then uses the data processor 1220 to aggregate or otherwise process the data in one or more identified records if such aggregation and/or processing is needed for the particular data view requested. For instance, in some embodiments, the data view might require the data processor 1220 to aggregate the data records for multiple bug events of the same type, in order to display data for a group of similar events.

The query engine 1215 uses the presentation generator 1225 to define display presentation for the collected and processed, database data. The query engine 1215 then provides the defined presentation to the UI module 1230, which forwards it to the device of the debug administrator (e.g., to the web browser of the administrator's computer or mobile device though a web server). Each time the user modifies the search query and the administrator's device does not have the data to process this modified search query, the UI module 1230 will receive an updated query request, which it then passes to query engine 1215. The query engine 1215 then repeats the data collection, processing and presentation operations and supplies new results to the UI module 1230 for forwarding to the debug administrator's device.

In addition to search query modifications, the debug administrator can request the collection of one or more data archives. This request is directed to the data archive collector 1235 through the debug dashboard and the UI module 1230. When the debug administrator has not requested the data archive for a specific bug event, but rather has requested one or more representative data archives for a group of similar events (e.g., for an event type associated with one process), the data archive collector 1235 selects a subset of one or more devices that have collected such data archives and directs these selected subset (through the device interface 1205) to provide their data archives. In some embodiments, the data archive collector 1235 uses a set of collection rules to identify on its own the subset of devices that should provide their data archives.

The data archive collector 1235 stores each data archive that it receives, from one of the devices that it contacts, in the data archive data store 1255. The debug administrator can review the content of these data archives through a viewer of the debug dashboard of some embodiments. Through the UI module 1230, the server set's viewer 1240 provides data archive content to the dashboard viewer for presentation to the user. In some embodiments, the server set's viewer 1240 allows the dashboard viewer to access and present multiple different types of data collections in the data archive data store 1255.

In some embodiments, two or more devices can operate in tandem in one environment (e.g., in a home) to perform a set of tasks together. Certain bug events can occur because of the interactions between such devices. To address the reporting of such bug events, the debugging architecture of some embodiments allows a first device that detects a potential bug event in a multi-device ecosystem, to direct one or more other devices to gather a data archive that relates to a state of the second device as it pertains to the detected potential bug event. These other devices are called secondary devices in the discussion below as the perform they bug event operations at the behest of the first device, which is referred to as a master device. Each slave device can provide the data archive to the server set for further analysis. In some embodiments, the master and slave devices can be of the same type (e.g., two computers) or can be of different types (e.g., phone and watch).

In some embodiments, the master device also generates a data archive that relates to the master device's state as it pertains to the potential bug event, and provides this data archive to the server set. In some embodiments, the master and slave devices provide their data archives to the server set automatically without the server set requesting these data archives. In other embodiments, these devices provide these data archives only after the server set has requested them.

In some embodiments, the master and slave devices also generate event signatures that they send to the server set to describe the potential bug event, and the server set requests the data archives after processing these signatures. In some of these embodiments, the master device's signature is a master signature, while the slave device's signature is a slave signature, as the master device's signature contains more information about the detected event than the slave device's signature. In other embodiments, the master and slave signatures contain the same or similar information; in these embodiments, the main distinction between master and slave signatures is that the master signature was generated by the master device, while the slave signature was generated by the slave device at the behest of the master device.

In some embodiments, the master device provides an identifier for the potential bug event to the slave device. This identifier is a universal unique identifier (UUID) that the master device generates for the instance of the potential bug event that it detects. The slave device uses this identifier to associate its event signature and/or event data archive with the event signature and/or event data archive that the master device generates. When the server set receives the event signatures and/or event data archives from the master and slave devices, it can use this unique identifier to associate the signatures and/or data archives that are collected from the two or more different devices. This association allows the two or more different data sets that are generated on the two or more different devices to be analyzed together to identify a root cause of a bug that is based on the interaction between the devices.

Figure 13:
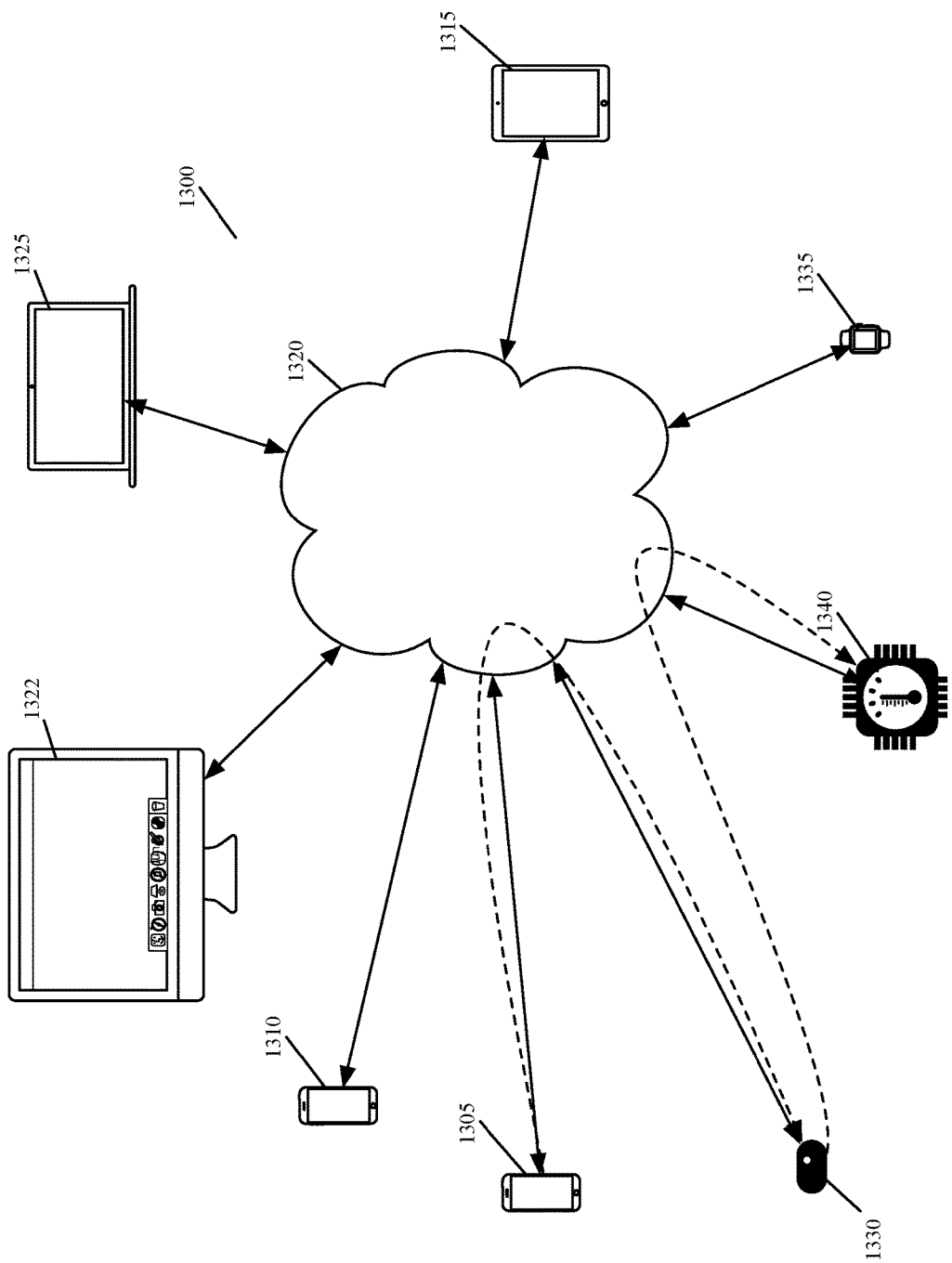
FIG. 13 illustrates a multi-device ecosystem in which multiple devices can operate in tandem to perform one or more tasks.

FIG. 13 illustrates a multi-device ecosystem in which multiple devices can operate in tandem to perform one or more tasks. This environment is a home 1300 in which two phones 1305/1310, one tablet 1315, a desktop computer 1322, a laptop computer 1325, a media streaming device 1330, a smartwatch 1335, and an IOT (Internet of Things) thermostat 1340 operate. Each of these devices connects to a local area network 1320 of the home, and this LAN connects to an external network, as further described below.

FIG. 13 also illustrates an example of a multi-device task that is performed by the phone 1305, media streaming device 1330, and the thermostat 1340. In some embodiments, the media streaming device 1330 serves as an interface between home related IOT devices (such as the thermostat 1340) and other computing devices in the home, such as the phones 1305/1310, computers 1322/1325, tablet 1315, and watch 1335.

Thus, as shown, when an application on the phone 1305 receives an adjustment to a temperature setting controlled by the thermostat 1340, the phone 1305 transmits a request for this adjustment to the thermostat 1340 through the media streaming device 1330. As further shown, the communication between these three devices in some embodiments is through the LAN 1320. In other embodiments, some or all of this communication (e.g., the communication between the phone 1305 and the media streaming device 1330) might be through peer-to-peer wireless communication (e.g., Bluetooth or Wi-Fi peer-to-peer connections). The multi-device task illustrated in FIG. 13 can fail due to operational failures at each device 1305, 1330 or 1340, or due to communication failures between the devices.

Figure 14:
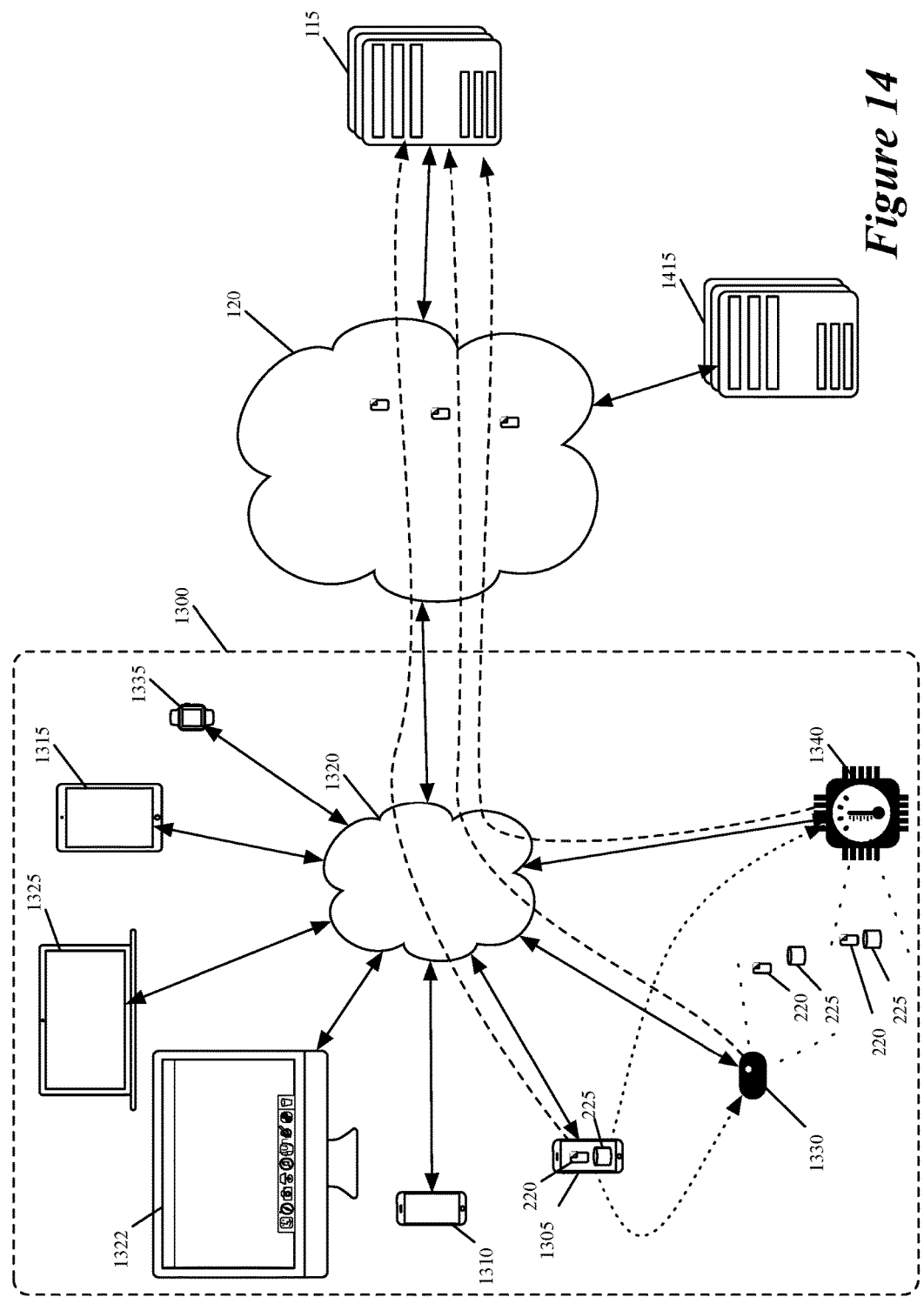
FIG. 14 illustrates that when a phone detects a bug event regarding the multi-device task illustrated in FIG. 13.

FIG. 14 illustrates that when the phone 1305 detects a bug event regarding the multi-device task illustrated in FIG. 13, the phone 1305 generates a multi-device, bug-event master signature and generates a data archive for this detected event. The phone also requests that the media streaming device 1330 and the thermostat 1340 generate slave signatures for this event and capture data archives for this event. The phone's request is transmitted to the devices 1330 and 1340 through the LAN 1320 in some embodiments, while it is sent to these devices through peer-to-peer communication in other embodiments.

In still other embodiments, this request is sent through a cloud synchronization service that a set of one or more remote servers 1415 provide to one or more devices at home 1300 in order to synchronize one or more types of content across these devices (e.g., keys, passwords, images, audio, video, documents, etc.). As shown, the home LAN 1320 connects to the synchronizing server set 1415 and the debug server set 115 through the network 120, and this connection can communicatively connect the devices at home 1300 to communicate with these servers. In some embodiments, the phone 1305 sends this request to the remote synchronizing servers 1415 only when the media streaming device 1330 and the thermostat 1340 do not acknowledge receiving this request after the phone 1305 tries to send this request one or more times through the LAN 1320 or through a direct peer-to-peer channel between the devices.

FIG. 14 shows the media streaming device 1330 and the thermostat 1340 to have generated their slave bug-event signatures 220, and to have captured their own data archives 225 for this event. It also shows these devices and the phone 1305 sending their generated signatures to the debugging server set 115 through the networks 1320 and 120. Even though the devices 1330 and 1340 generated signatures and data archives for the bug event identified by the phone 1305, this will not always be the case in some embodiments. When a master device directs a slave device to generate a data archive for a multi-device bug event, the slave device in some embodiments evaluates on its own whether it should gather such a data archive and only does so if it decides that it should not disregard (i.e., filter out) this request.

Figure 15:
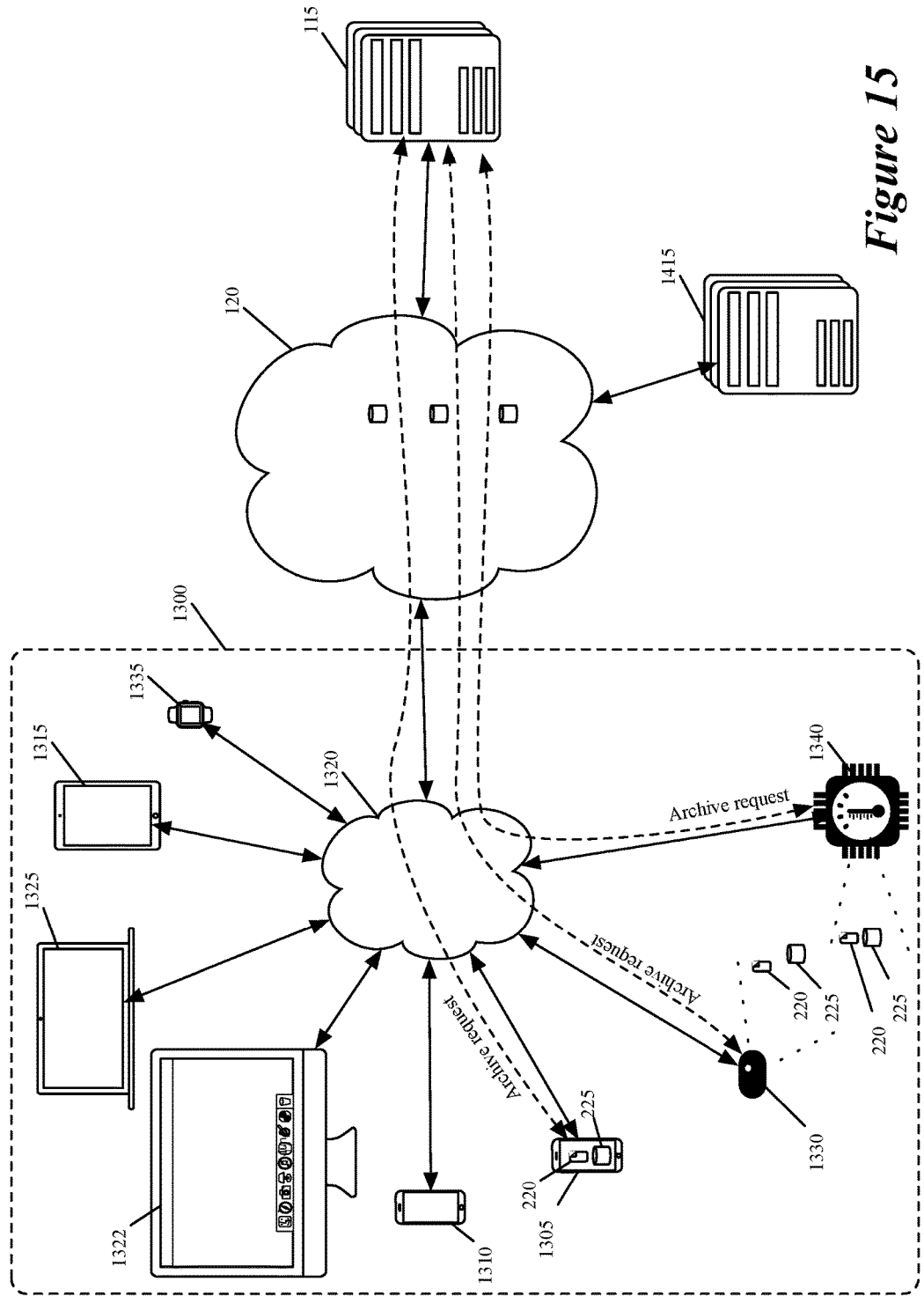
FIG. 15 illustrates the server set directing several devices to provide the data archives that they generated for the master and slave, multi-device bug event signatures that they reported to the server set.

FIG. 15 illustrates the server set 115 directing the devices 1305, 1330 and 1340 to provide the data archives that they generated for the master and slave, multi-device bug event signatures that they reported to the server set. It also shows the server set collecting these three data archives. In some embodiments, a device that is directed to generate a slave signature for a multi-device bug event might not generate a data archive for the slave signature. In other embodiments, however, such a device always generates a data archive for a multi-device bug event if it decides to generate a slave signature for the multi-device bug event (if it does not decide to filter out the request to generate the signature).

Also, in the examples illustrated in FIGS. 14 and 15, each of the devices involved in a multi-device task can generate a multi-device, bug-event signature and data archives. However, in some embodiments, not all of the devices involved in a multi-device transaction can generate such signatures and data archives. For instance, in some embodiments, the thermostat 1340 is not part of the bug-capturing ecosystem (e.g., has an OS that does not support this functionality, has an OS that is distributed by a different vendor than the distributor of the operating systems of other devices, etc.). In these embodiments, the server set 115 will receive bug-event signatures and data archives from only some of the devices involved in a multi-device task that is associated with a detected bug event. For example, when the thermostat 1340 is not part of the bug-capturing ecosystem, the server set 115 in the examples of FIGS. 14 and 15 only receives signatures and data archives from the phone 1305 and the media streaming device 1330 for the temperature-adjustment task that is associated with the detected bug event.

Figure 16:
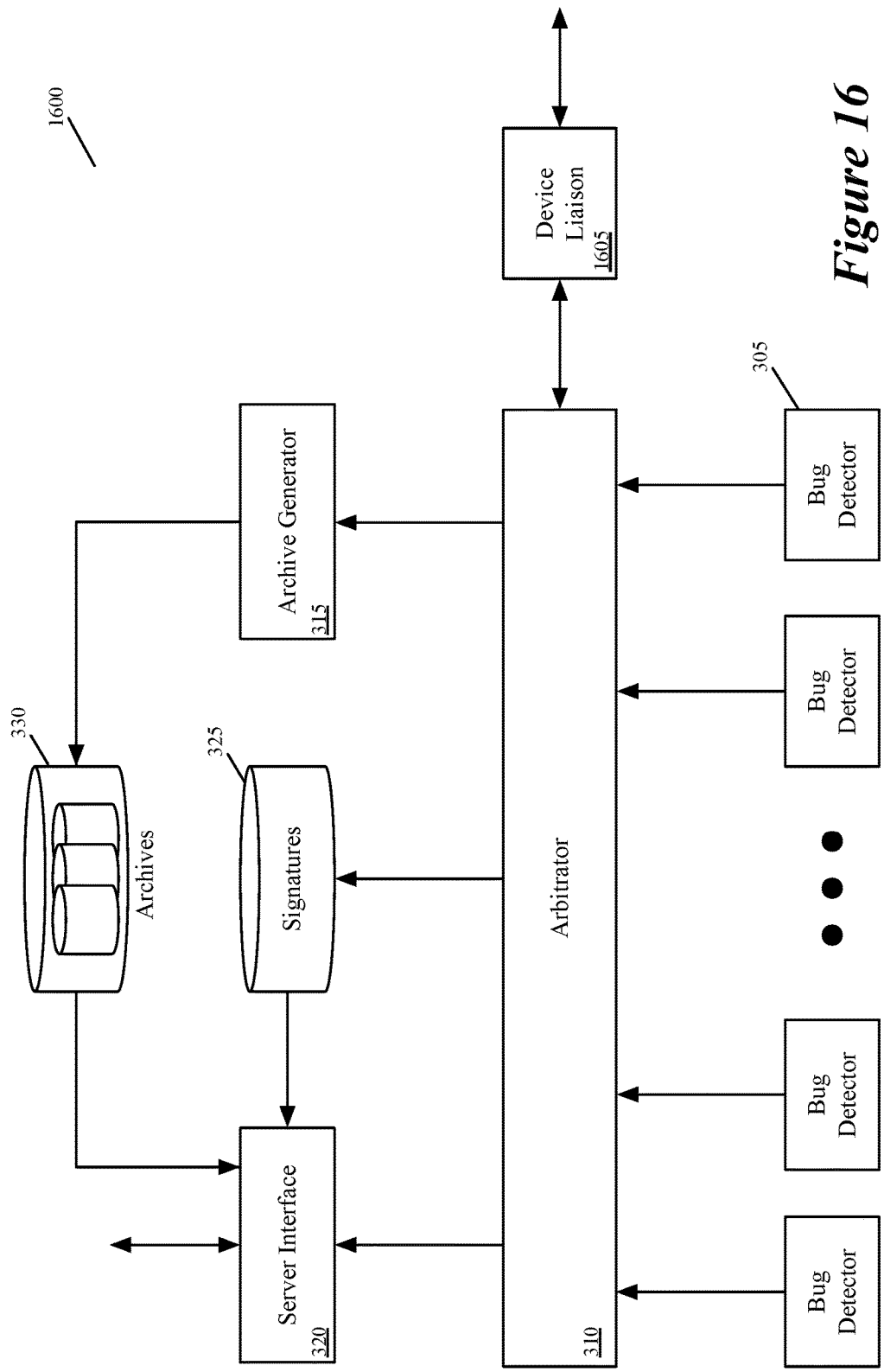
FIG. 16 illustrates a debug module of a device that can detect multi-device bug events, can direct other devices to capture signatures/data archives for these events, and/or receive requests from other devices that detect multi-device bug events.

FIG. 16 illustrates a debug module 1600 of a device (such as the devices 1305-1315, 1322-1340 of FIG. 13) that can detect multi-device bug events, can direct other devices to capture signatures/data archives for these events, and/or receive requests from other devices that detect multi-device bug events. As shown, this module is identical to the debug module 300 of FIG. 3, except that the debug module 1600 also has a device liaison 1605. On a device that identifies a multi-device bug event, the liaison 1605 is responsible for requesting one or more other devices that are associated with this bug event to capture signatures and data archives for this event. On such a device, the liaison receives such a request from the arbitrator 310 of its debug module 1600, and then passes along this request to the other devices in order to direct them to capture the desired signatures and data archives.

On the device that receives a signature and data archive request from another device that identified the multi-device bug event, the liaison 1605 receives the request, which includes a UUID for the detected multi-device bug event. The liaison is responsible for passing this request (with its associated UUID) to the arbitrator 310 of its debug module 1600. The arbitrator 310 then either filters out this request, or generates a signature and directs the data archive generator 315 of its debug module 1600 to generate a data archive for the detected event. When the arbitrator 310 decides not to filter out the request, the arbitrator embeds the UUID in the slave signature that it generates, and provides this UUID to the data archive generator so that it can associate its data archive with this identifier.

Figure 17:
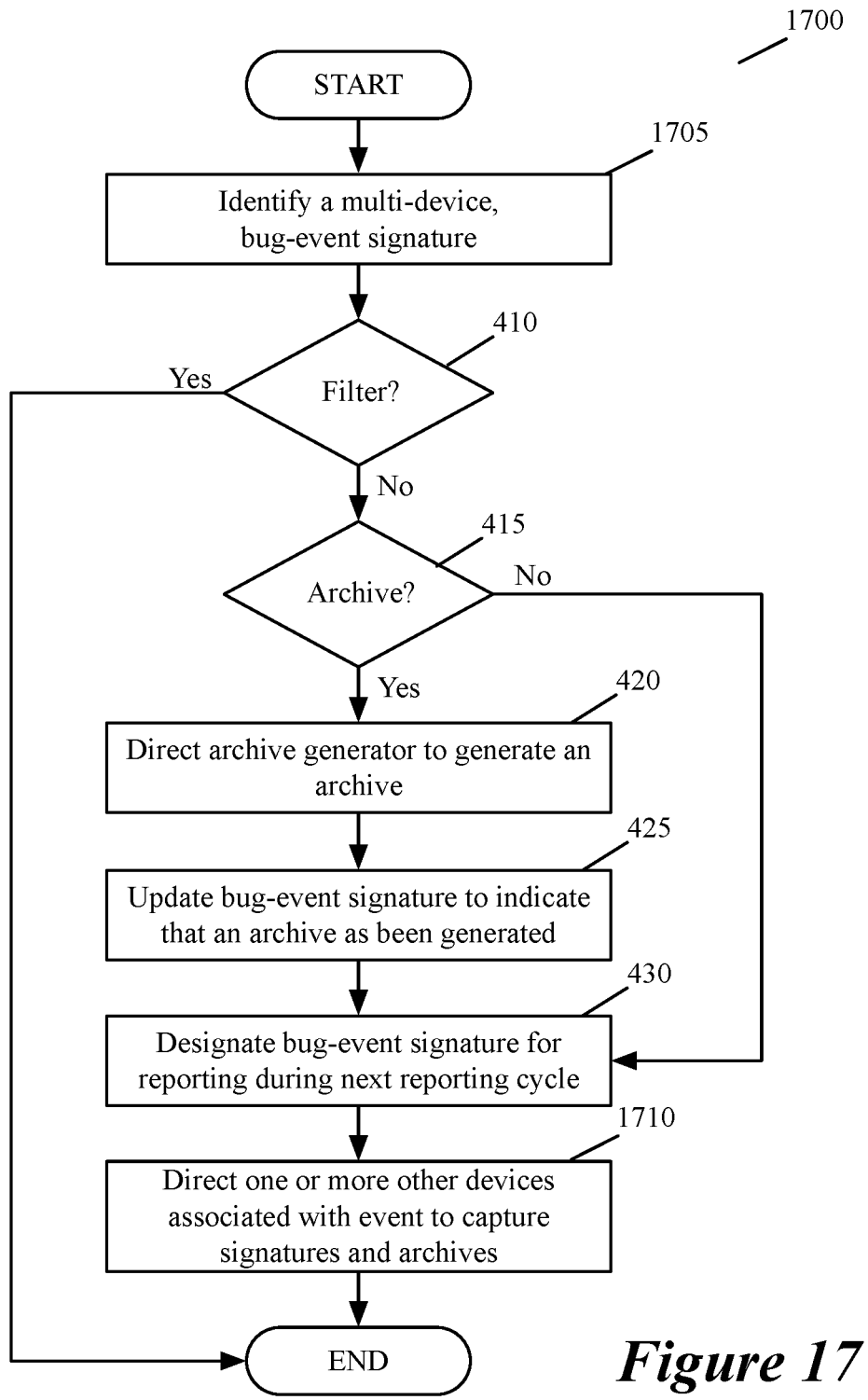
FIG. 17 illustrates a process that an arbitrator of a debug module of a device performs in some embodiments when a bug detector of its debug module identifies a multi-device bug event.

FIG. 17 illustrates a process 1700 that an arbitrator 310 of a debug module 1600 of a device performs in some embodiments when a bug detector of its debug module identifies a multi-device bug event. This process is similar to the process 400 of FIG. 4, except for a few operations that have been assigned different reference numbers in FIG. 17. As shown, the process 1700 starts (at 1705) when the arbitrator 310 receives a signature from one of its debug module's bug detectors 305 a multi-device, bug-event signature. In some embodiments, bug-event signatures can describe single device bug-events or multi-device bug-events. To do this, each signature file in some embodiments has a related-device field (e.g., an array) that when left null identifies the signature file as describing a single device bug event, and when specifying one or more other devices identifies the signature file as describing a multi-device bug event.

As shown in FIG. 17, the process 1700 performs the same operations 410-430 for the identified multi-device bug event as process 400 performs for the single-device bug event. However, after performing these operations, the process 1700 directs (at 1710) the device liaison 1605 of its debug module 1600 to direct one or more other devices associated with the detected bug event to capture signatures and data archives for this event. These other devices are devices identified in the signature that the arbitrator received from the bug detector that generated the multi-device bug event, which started the process 1700. Also, in directing the device liaison 1605, the process 1700 provides the UUID that it generated for the multi-device bug event, so that the liaison can pass along this UUID to the other device(s), which in turn can then include this UUID with the signature(s) and data archive(s) that they generate. After 1710, the process 1700 ends.

Figure 18:
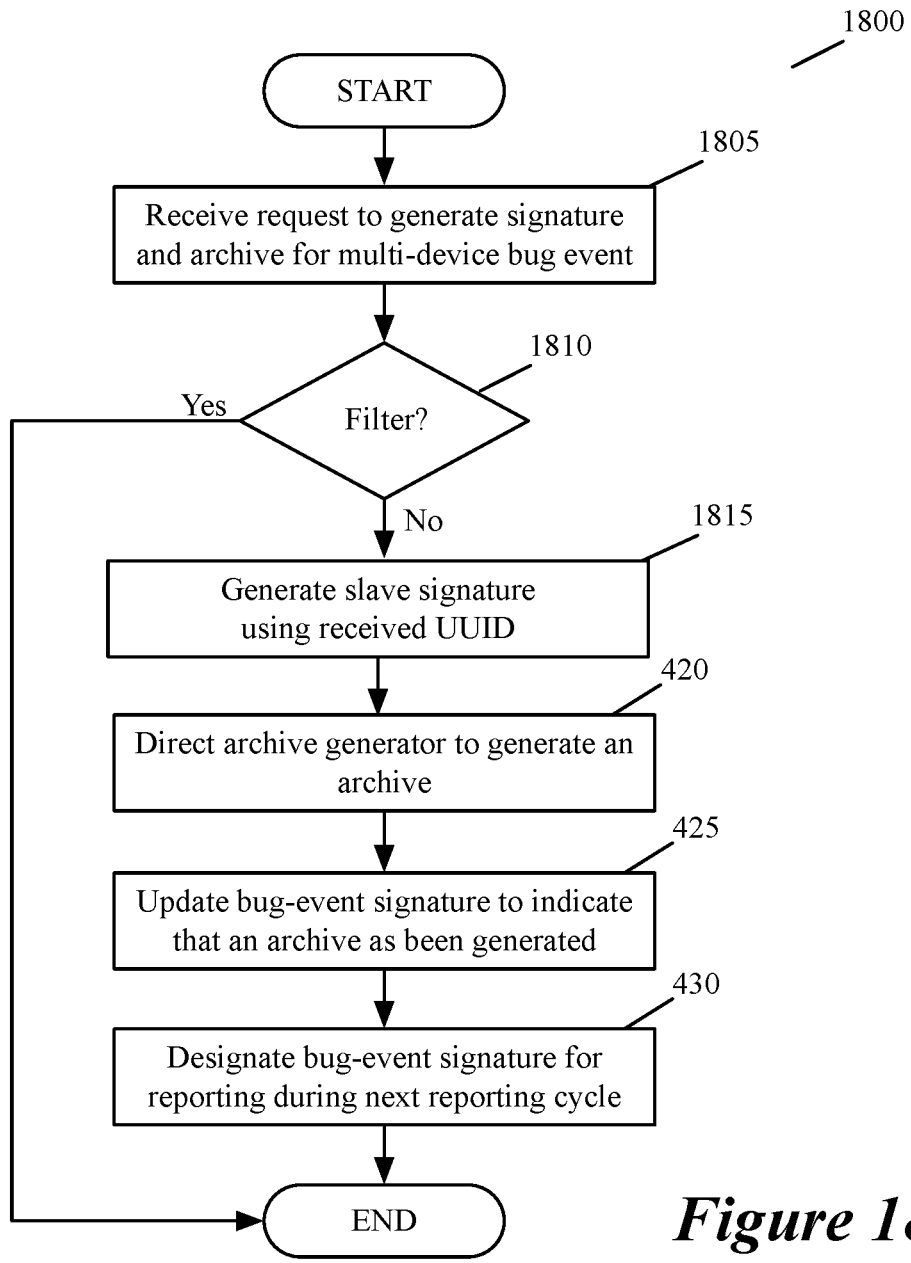
FIG. 18 illustrates a process that an arbitrator of a debug module of a device performs in some embodiments when directed by another device to capture bug-event signatures and data archives for an identified multi-device bug event.

FIG. 18 illustrates a process 1800 that an arbitrator 310 of a debug module 1600 of a device performs in some embodiments when directed by another device to capture bug-event signatures and data archives for an identified multi-device bug event. This process is similar to the process 400 of FIG. 4, except for a few operations that have been assigned different reference numbers in FIG. 18. As shown, the process 1800 starts (at 1805) when the arbitrator 310 receives a request from the device liaison 1605 of its debug module to generate a signature for a multi-device, bug event identified on another device. This request is accompanied with a UUID for the identified multi-device, bug event.

Next, at 1810, the process determines whether it should discard this request. In some embodiments, the arbitrator 310 uses (at 1810) the same filtering criteria to assess whether to filter out locally identified bug-event signatures (i.e., signatures generated by the bug detectors 305 of its debug module 1600) and remotely identified bug-event signatures (i.e., signatures generated by the bug detectors 305 of debug modules of other devices). In other embodiments, the arbitrator uses (at 1810) different filtering criteria for locally and remotely detected bug events. For example, in some embodiments, the filtering criteria for remotely identified bugs discard fewer multi-device, bug event signatures than the filtering criteria for locally identified bugs. This is because in some embodiments the devices detect fewer multi-device bug events.

If the process determines (at 1810) that it should filter out the request, the process ends. Otherwise, at 1815, it generates a slave bug-event signature and stores the received UUID in this signature. In some embodiments, the process 1800 will have a data archive generated each time that it does not filter out a request from another device to generate a slave signature for an identified multi-device, bug event. Hence, in these embodiments, the process 1800 performs the above-described operations 420-430 to generate a data archive for the identified bug event, to update the signature to indicate the generation of the data archive, and to designate the generated slave bug-event signature for reporting during the next reporting cycle. After 430, the process ends. As mentioned above, a device in other embodiments can generate a slave multi-device, bug-event signature, but forego collecting the data archive for the generated slave signature.

Bugs related to energy consumption are not always noticeable by the user. An event that causes a 90% battery drain on a mobile device by midafternoon would be obvious, but an event that causes a 5% drain over ten minutes could go unnoticed. Therefore, in some embodiments, energy consumption-related bugs are defined in terms of thresholds that are specific to different processes executing on the device, defined from analytics on unbiased usage data collected in the field. For example, if the bug detector on a mobile device detects that battery drain from a chat application exceeds the $99^{th}$ percentile for typical activity, it would be flagged automatically as a bug, even if the absolute amount of battery drain in mAh is identical to the average drain from a gaming application over the same period of time.

There are a number of proxy factors for energy consumption that must also be monitored. One example is excessive CPU usage by an application or process. Another example is device wakefulness (also known as device assertion) when it should be asleep, such as when in a pocket or charging. A third example is unusual networking activity, where the device radio is active for long periods of time, even if the device is untethered and the screen is dark. To identify battery life bugs, atypical activity by proxy components such as radio and CPU are correlated by the expert system of a bug detector with contextual device information like wake status, screen condition, and charging status.

Bugs related to networking are often very nuanced, because there are numerous layers from the lowest level of radio hardware to the highest level of data transport protocols. Further, the networking domain is exposed to countless environmental variables that lie outside the device itself. Environmental variables include local and wide area network infrastructure, global Internet connectivity, wireless carrier, device firmware, and even geographical location. Due to this environmental complexity and the asynchronous nature of networking, networking problems unrelated to the device may manifest in a similar way as would a bug event on the device itself.

For example, a website may fail to load in the web browser. This could be caused by problems with the wireless connection, an error at the network access point, or HTML/Javascript errors in the website. As far as the device is concerned, these are normal behavior, not bugs. If each website loading failure were reported as a bug, false positive reports would overwhelm the bug detection system.

The expert system of a bug detector performs triage on the device to filter networking problems. The system probes each of the various layers and builds a model that allows it to detect inconsistencies. For example, website A may be inaccessible, but website B remains accessible. The expert system collects these inconsistencies and uses them to consult a decision tree of various hypotheses as to why the problem is occurring, and play devil's advocate. Only a small fraction of detected networking problems will result in a potential bug classification, for follow-up with packet traces for more in-depth analysis.

Typically, a device does not act in isolation, but is connected to other devices in an ecosystem associated with the user account. When devices interact in the networking domain, the root cause for a bug may reside on one device, but may manifest on a connected device. Hence, in a multi-device ecosystem in which multiple devices can interact to perform one or more tasks conjunctively, it is important to obtain data from all the devices to have a complete view of the circumstances that led to the bug event.

As mentioned above, a data archive is a collection of data, often as free-form data from one or more devices. A data archive can include files from the device disk(s), database snapshots, process memory dumps, tcpdump output, syslog and oslog archives, hardware state, crash reports, and CPU spin reports. It may further contain data specific to the taxonomy of the bug event. For example, in the energy consumption domain, the data archive may also contain powerlogs (time-series information about battery drain and associated activities). In the networking domain, the data archive may also contain Wi-Fi® logs, networking logs, packet traces (TCP Dumps), and expert system logs. Further, the data archives may contain configuration and state information from the networking layer at the time the issue occurred.

Consider an example of a networking bug in which a device fails to discover available peers for sending files using a network file-sharing service. The device's detectors generate a signature file, which includes this information:

```
{
  "case_status" : {
    "closure_type" : "ClientRequest",
    "case_opened_timestamp" : 1483062432.611984,
    "case_closed_timestamp" : 1483062483.754792,
    "dampening_type" : "None"
  },
  "signature" : {
    "detected" : "sharingd",
    "additional" : "",
    "threshval" : "1",
    "type" : "Functional",
    "domain" : "Networking",
    "subtype" : "com.company.sharingd.filedrop.discovery.failed"
  },
  "system_properties" : {
    "product_version" : "10.3",
    "build_version" : "14E219",
    "product_type" : "Phone9,2",
    "product_name" : "Phone OS"
  },
  "events" : [
    {
      "status" : "success",
      "timestamp" : 1483062439.636803,
      "type" : "probe",
      "name" : "AWDL Peer Poll"
    }
  ]
}
  "attachments" : [
    "file:///private/var/networkd/Library/Logs/Debuggability/get_network_info-12-29-2016-174801.tar.gz",
    "file:///private/var/networkd/Library/Logs/Debuggability/packets-12-29-2016-174801-0.pcapng",
    "file:///private/var/networkd/Library/Logs/Debuggability/get_network_info-12-29-2016-174801.tar.gz",
    "file:///private/var/networkd/Library/Logs/Debuggability/logs-12-29-2016-174801.tar.gz",
    "file:///private/var/networkd/Library/Logs/Debuggability/crashes_and_spins-12-29-2016-174801.tar.gz",
    "file:///private/var/networkd/Library/Logs/Debuggability/case_summary_12-29-2016-174801.json"
    "file:\\/private\\var\\networkd\\Library\\Logs\\Debuggability\\FECA6787-CB21-4855-AE64-828B0EDB7D89-2016-12-29_174801-com.company.DiagnosticExtensions.WiFi.tar.gz
  ]
```

This signature file describes the taxonomy of the networking bug event. The domain and type are the high-level category and subcategory to which the issue belongs; in this example, the domain is "networking" and the type is "functional", indicating that the bug is related to network functionality. The subtype is a further refinement of the type that is more descriptive, in this case indicating the specific process involved and the type of failure.

In addition to the bug taxonomy, the signature file also includes system properties (device type, OS version, etc.), an event trace describing the events that led to the capture of the signature, and other information describing the event added by the device's arbitrator. For example, after the failure of the sharingd process to discover any file-sharing peers, an expert system of a bug detector was able to discover at least one peer, to send networking pings to it, and to get responses.

In this example, the device's data archive generator generates a data archive that includes Wi-Fi® logs, networking logs, packet traces (TCP dumps), and logs of a bug detector's expert system. The packet trace indicated that there was a "deafness" on a particular 5 GHz channel, which was determined to be the root cause. The relevant portion of the packet trace is excerpted below, revealing that channel 149 had a number of "NoACK" (no-acknowledgement) errors:

[Driver Log]<awdl0 ktask> start:39161.351 sn=4708/09 ch=149.80 MHz, I=9A:0C M=8A:3F:E8:88:89:9A TM=8A:3F:E8:88:89:9A TM met 426 HC 1 met 411 TMLFC [30,30]_selfLFC [40,42] pkt 63
[Packet Dump]<Rx(c)>dpap→55462 [PUSH ACK] Seq=1 ACK=224 Win=131072 TS=367477470 TSEcho=739726428
[Packet Dump]<Net>55462→dpap [ACK] Seq=224 ACK=95 Win=131200 TS=739726465 TSEcho=367477470
[Packet Dump]<Rx(c)>dpap→55462 [ACK] Seq=95 ACK=224 Win=131072 TS=367477470 TSEcho=739726428
[Packet Dump]<NoACK>55462→dpap [ACK] Seq=224 ACK=95 Win=131200 TS=739726465 TSEcho=367477470
[Packet Dump]<Rx(c)>dpap→55462 [PUSH ACK] Seq=1507 ACK=224 Win=131072 TS=367477470 TSEcho=739726428
[Packet Dump]<Net>55462→dpap [ACK] Seq=224 ACK=2548 Win=130016 TS=739726470 TSEcho=367477470
[Packet Dump]<NoACK>55462→dpap [ACK] Seq=224 ACK=2548 Win=130016 TS=739726470 TSEcho=367477470

As the above example demonstrates, the signature file only describes the symptoms of the networking bug event, such as a failure to discover a peer on the network. The signature does not contain sufficient information to diagnose why the peer discovery bug occurred. The data archive contains the contextual information that is required for diagnosis, specifically the deafness on a wireless channel. The size of the signature file in this example was 133 KB, whereas the size of all the data archives was 103 MB.

Consider an example of an energy consumption bug in which a process causes excessive CPU usage (i.e., causing the CPU to "spin"), draining the battery. The device's detectors generate a signature file, which includes this information:

```
{
  "case_status" : {
    "dampening_type" : "None",
    "case_opened_timestamp" : 1490829367.529061,
    "closure_type" : "ClientRequest",
    "case_closed_timestamp" : 1490830072.530021,
    "case_closed_time" : "2017-03-29T23:27:52Z",
    "case_opened_time" : "2017-03-29T23:16:07Z"
  },
  "signature" : {
    "detected" : "coreduetd",
    "threshval" : "90011749000 nanoseconds of CPU usage over 131.00s seconds",
```

```
        "domain" : "Energy",
        "type" : "CPU",
        "subtype" : "ShortTerm"
    },
    "system_properties" : {
        "product_version" : "11.0",
        "build_version" : "15A245",
        "product_type" : "Phone7,1",
        "product_name" : "Phone OS"
    },
    "events" : [
        {
            "value" : 1,
            "timestamp" : 1490829367.750146,
            "count" : 1,
            "type" : "DiagnosticExtension",
            "name" : "com.company.PowerlogCore.diagnosticextension"
        },
    ],
    "attachments" : [
        "file:\/\/\/var\/mobile\/Library\/Logs\/AutoBugCapture\/
D997C907-4334-482C-B39E-427F4CCE0412-2017-03-29__161608-
com.company.PowerlogCore.diagnosticextension.tar.gz",
        "file:\/\/\/private\/var\/networkd\/Library\/Logs\/Debuggability\/
get_network_info-03-29-2017-161608.tar.gz",
        "file:\/\/\/private\/var\/networkd\/Library\/Logs\/Debuggability\/
crashes_and_spins-03-29-2017-162128.tar.gz",
        "file:\/\/\/private\/var\/networkd\/Library\/Logs\/Debuggability\/
logs-03-29-2017-162128.tar.gz"
    ]
  }
}
```

Again, this signature file describes the taxonomy of the energy consumption bug event. The domain and type are the high-level category and subcategory to which the issue belongs; in this example, the domain is "energy" and the type is "CPU", indicating that the bug is related to CPU spin. The subtype is a further refinement of the type that is more descriptive, in this case indicating that the energy issue is a short-term energy problem.

In addition to the bug taxonomy, the signature file also includes system properties (device type, OS version, etc.), an event trace describing the events that led to the capture of the signature, and other information describing the event added by the device's arbitrator. For example, the signature includes a list of files that would be included in a data archive.

In this example, the device's data archive generator generates a data archive that includes a powerlog (time-series information about battery drain and associated activities), crash reports and details of CPU spins occurring on the device, and OS free-form logs from all processes. The powerlog provided information on what was happening on the device prior to the coreduetd spin, whereas the crash report provided which lines of code were executing when the issue occurred. As an example, below is a portion of a report included in the tar file which includes details of the CPU spin occurring on device:

Powerstats for: coreduetd [102]
UUID: 6E360542-4D58-3128-88F3-AA7309C9AAF8
Start time: 2017-03-29 16:15:53-0700
End time: 2017-03-29 16:16:04-0700
Parent: launchd.development
Microstackshots: 19 samples (63%)
Primary state: 19 samples Non-Frontmost App, User mode, Effective Thread QoS User Initiated, Requested Thread QoS Utility, Override Thread QoS User Initiated
User Activity: 19 samples Idle, 0 samples Active
Power Source: 19 samples on Battery, 0 samples on AC 19_pthread_wqthread (in libsystem_pthread.dylib)+928 (/BuildRoot/Library/Caches/com.apple.xbs/Sources/libpthread/libpthread-275/src/pthread.c:2175) [0x1a917084c]
19_dispatch_workloop_worker_thread$VARIANT$mp (in libdispatch.dylib)+920 (/BuildRoot/Library/Caches/com.apple.xbs/Sources/libdispatch/libdispatch-837/src/source.c:2457) [0x1a8f0570c]
19_dispatch_root_queue_drain_deferred_item$VARIANT$mp (in libdispatch.dylib)+484(/BuildRoot/Library/Caches/com.apple.xbs/Sources/libdispatch/libdispatch-837/src/inline_internal.h:2389) [0x1a8efda98]
19_dispatch_queue_invoke$VARIANT$mp (in libdispatch.dylib)+664 (/BuildRRoot/Library/Caches/com.apple.xbs/Sources/libdispatch/libdispatch-837/src/queue.c:0) [0x1a8efd3b4]
19_dispatch_queue_serial_drain$VARIANT$mp (in libdispatch.dylib)+528 (/BuildRoot/Library/Caches/com.apple.xbs/Sources/libdispatch/libdispatch-837/src/inline_internal.h:2346) [0x1a8efc98c]
19 dispatch_client_callout (in libdispatch.dylib)+16 (/BuildRoot/Library/Caches/com.apple.xbs/Sources/libdispatch/libdispatch-837/src/object.m:490) [0x1a8ef2c2c]
19_dispatch_call_block_and_release (in libdispatch.dylib)+24 (/BuildRRoot/Library/Caches/com.apple.xbs/Sources/libdispatch/libdispatch-837/src/init.c:974) [0x1a8ef2c6c]
19_65-[DKKnowledgeStorage executeQuery:responseQueue:withCompletion:]_block_invoke (in CoreDuet)+68 (/BuildRoot/Library/Caches/com.apple.xbs/Sources/CoreDuet/CoreDuet-803/CoreDuetFramework/CoreDuetFramework/Knowledge/Storage/_DKKnowledgeStorage.m:0) [0x192f0243c]

As the above example demonstrates, the signature file only describes the symptoms of the energy consumption bug event, such as a CPU spin. The signature does not contain sufficient information to diagnose why the CPU spin bug occurred. The data archive contains the contextual information that is required for diagnosis, specifically which lines of code were executing during the event. The size of the signature file in this example was 4 KB, whereas the size of all the data archives was 20 MB.

Consider an example of a distributed bug in which the user attempts to turn off a wireless power switch, using their phone, with a tablet acting as a relay between the phone and the switch. The attempt fails, and the phone's detectors generate a signature file, which includes this information:

```
{
    "case_identifier" : "D8A1FE2B-8F82-43B9-94F4-
23FDB2806940",
    "signature" : {
        "detected" : "homed",
        "domain" : "HomeHub",
        "groupID" : "D8A1FE2B-8F82-43B9-94F4-
23FDB2806940_C6874FD2-4946-41E0-86E5-C9CBA0E6C5C9",
        "subtype" : "Manufacturer: Home Automation Systems
Model: Power Switch Firmware: 1.3.1",
        "additional" : "errorCode: 4",
        "type" : "Remote Write Failure",
        "threshval" : "1"
    },
    "case_status" : {
        "case_opened_time" : "2017-05-12T14:35:41Z",
        "case_closed_time" : "2017-05-12T14:35:56Z",
        "case_opened_timestamp" : 1494599741.0856559,
        "dampening_type" : "None",
```

```
        "case_closed_timestamp" : 1494599756.474962,
        "remote_trigger" : false,
        "closure_type" : "ClientRequest"
    },
    "system_properties" : {
        "product_version" : "11.0",
        "build_version" : "15A279a",
        "product_type" : "Phone8,1",
        "product_name" : "Phone OS"
    },
    "events" : [
        {
            "result" : "success",
            "endpoint" : "HomeHub",
            "timestamp" : 1494599741.0955739,
            "count" : 1,
            "type" : "remoteTrigger",
            "name" : "IDSTransport"
        },
    ],
    "attachments" : [
        "file:\/\/\/private\/var\/networkd\/Library\/Logs\/Debuggability\/get_network_info-05-12-2017-073541.tar.gz",
        "file:\/\/\/private\/var\/networkd\/Library\/Logs\/Debuggability\/crashes_and_spins-05-12-2017-073548.tar.gz",
        "file:\/\/\/private\/var\/networkd\/Library\/Logs\/Debuggability\/logs-05-12-2017-073548.tar.gz"
    ]
}
```

Since the phone is involved in a distributed operation with the tablet, it also sends a trigger to the tablet, to generate its own signature file including the following information:

```
{
    "case_identifier" : "AD849100-CAA5-42F3-AB96-F1A56E6ED2B1",
    "signature" : {
        "detected" : "homed",
        "additional" : "errorCode: 4",
        "groupID" : "D8A1FE2B-8F82-43B9-94F4-23FDB2806940_C6874FD2-4946-41E0-86E5-C9CBA0E6C5C9",
        "type" : "Remote Write Failure",
        "subtype" : "Manufacturer: Home Automation Systems Model: Power Switch Firmware: 1.3.1",
        "domain" : "HomeHub"
    },
    "case_status" : {
        "case_opened_time" : "2017-05-12T14:35:42Z",
        "case_closed_time" : "2017-05-12T14:36:03Z",
        "case_opened_timestamp" : 1494599742.804426,
        "dampening_type" : "None",
        "case_closed_timestamp" : 1494599763.317836,
        "remote_trigger" : true,
        "closure_type" : "ClientRequest"
    },
    "system_properties" : {
        "product_version" : "11.0",
        "build_version" : "15A279a",
        "product_type" : "Pad4,8",
        "product_name" : "Phone OS"
    },
    "events" : [
        {
            "type" : "CrossDeviceTrigger",
            "name" : "IDSTransportReceive",
            "timestamp" : 1494599742.712328
        },
    ],
    "attachments" : [
        "file:\/\/\/private\/var\/networkd\/Library\/Logs\/Debuggability\/get_network_info-05-12-2017-073542.tar.gz",
        "file:\/\/\/private\/var\/networkd\/Library\/Logs\/Debuggability\/crashes_and_spins-05-12-2017-073549.tar.gz",
        "file:\/\/\/private\/var\/networkd\/Library\/Logs\/Debuggability\/logs-05-12-2017-073549.tar.gz"
    ]
}
```

These signature files describe the taxonomy of the distributed bug event. The domain and type are the high-level category and subcategory to which the issue belongs; in this example, the domain is "HomeHub" (related to home automation) and the type is "Remote Write Failure", indicating that the bug is related to remote interaction with a remote device. The subtype is a further refinement of the type that is more descriptive, in this case indicating that the remote device is a power switch from a particular manufacturer.

In addition to the bug taxonomy, the signature file also includes system properties (device type, OS version, etc.), an event trace describing the events that led to the capture of the signature, and other information describing the event added by the device's arbitrator. For example, the phone's signature file includes the event of sending the trigger to the tablet, and the tablet's signature file includes the event of receiving that trigger.

The signature files also include a group ID derived from the parent device case identifier, in this case the phone. The group ID is used to keep track of the signatures and data archives from different devices in the same distributed bug case. The group ID also allows the developer to download the data archives from all associated devices in the bug event.

In this example, the data archives for the phone and the tablet in this case each include networking logs, crash reports and details of CPU spins occurring on the device, and OS free-form logs from all processes. The tablet's OS log reveals a Bluetooth® connectivity failure between the tablet and the wireless power switch:

default 2017-05-12 14:28:27.340627-0700 bluetoothd Bluetooth is powered off—notifying session "com.apple-.sharingd-peripheral-68-9"

As the above example demonstrates, the signature file only describes the symptoms of the distributed bug event, such as a failure to remotely turn off a power switch using a tablet as a relay. The signature does not contain sufficient information to diagnose why the distributed bug occurred. The data archive contains the contextual information that is required for diagnosis, specifically the Bluetooth® connectivity failure between the tablet and the power switch. The size of the signature file was 2 KB, whereas the size of all the attachments was 26 MB.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
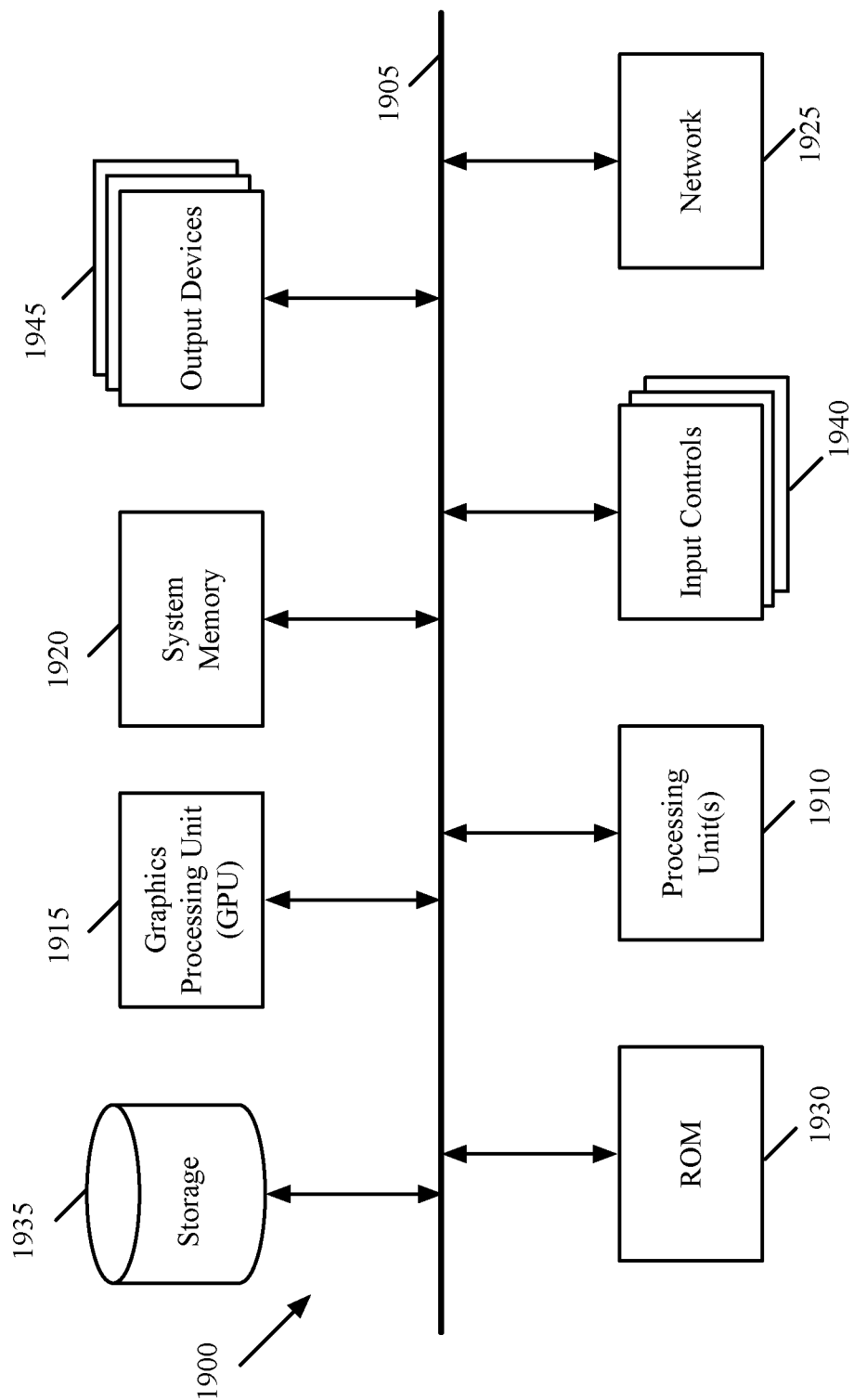
FIG. 19 conceptually illustrates an electronic system with which some embodiments of the invention are implemented.

FIG. 19 conceptually illustrates an electronic system 1900 with which some embodiments of the invention are implemented. The electronic system 1900 may be a computer (e.g., a desktop computer, personal computer, tablet computer, etc.), phone, or any other sort of electronic or computing device. Such an electronic system includes various types of computer readable media and interfaces for various other types of computer readable media. Electronic system 1900 includes a bus 1905, processing unit(s) 1910, a graphics processing unit (GPU) 1915, a system memory 1920, a network 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the GPU 1915, the system memory 1920, and the permanent storage device 1935.

From these various memory units, the processing unit(s) 1910 retrieves instructions to execute and data to process in order to execute the processes of the invention. The processing unit(s) may be a single processor or a multi-core processor in different embodiments. Some instructions are passed to and executed by the GPU 1915. The GPU 1915 can offload various computations or complement the image processing provided by the processing unit(s) 1910.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive) as the permanent storage device 1935.

Other embodiments use a removable storage device (such as a floppy disk, flash memory device, etc., and its corresponding drive) as the permanent storage device. Like the permanent storage device 1935, the system memory 1920 is a read-and-write memory device. However, unlike storage device 1935, the system memory 1920 is a volatile read-and-write memory, such a random access memory. The system memory 1920 stores some of the instructions and data that the processor needs at runtime. In some embodiments, the invention's processes are stored in the system memory 1920, the permanent storage device 1935, and/or the read-only memory 1930. For example, the various memory units include instructions for processing multimedia clips in accordance with some embodiments. From these various memory units, the processing unit(s) 1910 retrieves instructions to execute and data to process in order to execute the processes of some embodiments.

The bus 1905 also connects to the input and output devices 1940 and 1945. The input devices 1940 enable the user to communicate information and select commands to the electronic system. The input devices 1940 include alphanumeric keyboards and pointing devices (also called "cursor control devices"), cameras (e.g., webcams), microphones or similar devices for receiving voice commands, etc. The output devices 1945 display images generated by the electronic system or otherwise output data. The output devices 1945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 19, bus 1905 also couples electronic system 1900 to a network 1925 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4, 6, 7, 17, and 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method of reporting potential bug events in an ecosystem with first and second devices, the method comprising:
    at the first device,
       detecting a potential bug event; and
       directing the second device to gather a collection of one or more data sets relating to a state of the second device, the collection of the one or more data sets for reporting to a set of servers that obtain collections of data sets from devices in order to analyze bug events.

2. The method of claim 1, further comprising:
   gathering, at the first device, another collection of one or more data sets relating to a first-device state pertaining to the potential bug event; and
   providing the other collection of the one or more data sets to the set of servers to associate with the collection of data sets obtained from the second device, in order to analyze the detected potential bug event.

3. The method of claim 1, further comprising:
   from the first device, providing an identifier to identify the potential bug event, said identifier for the second device to use to associate the collection of data sets to the potential bug event.

4. The method of claim 3, further comprising generating, at the first device, the identifier as a unique identifier that is associated with the potential bug event.

5. The method of claim 3, further comprising:
   gathering, at the first device, another collection of one or more data sets relating to a first-device state pertaining to the potential bug event;
   associating the other collection of the one or more data sets with the identifier; and
   providing the other collection of the one or more data sets to the set of servers to associate with the collection of the one or more data sets obtained from the second device, in order to analyze the detected potential bug event, the server set associating the two collections of the one or more data sets through their association with the identifier.

6. The method of claim 1,
   wherein the first and second devices perform at least one task by communicating with each other through a communication network, and the detected potential bug event relates to the task.

7. The method of claim 1, wherein the detecting and directing are performed without user intervention on either the first device or second device to detect or to report a bug event.

8. The method of claim 1, further comprising:
   at the first device,
      generating a first description to describe the potential bug event, said first description comprising an event identifier;
      reporting the first description to the set of servers; and
      providing the event identifier to the second device to include in a second description generated on the second device and reported to the set of servers by the second device;
      wherein the first and second devices provide the collections of the one or more data sets to the set of servers only if the set of servers directs them to send the collections to the set of servers.

9. The method of claim 8, further comprising deleting the collection of data set on the first device when the set of servers does not request the collection within a particular duration of time or after providing the set of servers the collection.

10. The method of claim 8, wherein the generated descriptions are structured descriptions of events that are contained in data structures generated and populated on the first and second devices to describe the bug events, while the collections of data sets comprise unstructured collections of data that are duplicated or captured on the first and second devices and that pertain to the device states relating to the bug events.

11. The method of claim 10, wherein the data structures are XML (extensible markup language) files or JSON (Javascript Object Notation) files.

12. The method of claim 10, wherein the unstructured collections of data on the first device comprises a plurality of files duplicated on the first device and stored as a duplicate copy on the first device.

13. The method of claim 12, wherein the unstructured collections of data on the first device further comprises one database or a data structure that contains data extracted from a database operating on the first device.

14. The method of claim 1, wherein the first and second devices are two different types of devices, wherein two different types of devices are two of a smartphone, a smart watch, a tablet, a computer, and a media streaming device.

15. The method of claim 1, wherein directing the second device to gather the collection of data sets further comprises directing the second device to report the collection of data sets to the set of servers.

16. A debugging method comprising:
    from a plurality of devices collecting data sets about a plurality of bug events detected on the devices;
    processing data that is contained in the collected data sets and that pertains to the plurality of bug events; and
    said processing comprising associating at least two data sets collected from two different devices as being associated with one task performed conjunctively by the two devices,
    said association allowing the at least two data sets to be analyzed together to identify a cause of a multi-device bug event associated with the task.

17. The method of claim 16, wherein said associating comprises using an event identifier associated with each of the at least two data sets to determine that the at least two data sets are related to each other.

18. The method of claim 17, wherein the event identifier is a universal unique identifier (UUID).

19. The method of claim 18, wherein the UUID is generated by a first device of the two devices, the first device providing the UUID to a second device for the second device to associate with the data set that the second device collects for the multi-device bug event.

20. The method of claim 16, wherein the two devices are part of a first group of devices, wherein said processing further comprises associating a group of more than two data sets collected from a second group of more than two different devices as being associated with one task performed in conjunction by the devices in the second group.

21. The method of claim 20, wherein the two devices in each group of devices work in one multi-device ecosystem in which the devices are connected through at least one of a local area network and wireless peer-to-peer connections.

22. The method of claim 16, wherein allowing the at least two data sets to be analyzed together comprising presenting the at least two data sets conjunctively to a debug administrator to review to identify the cause of the multi-device bug event.

23. The method of claim 16, wherein allowing the at least two data sets to be analyzed together comprising providing the at least two data sets to an automated process to analyze conjunctively to identify the cause of the multi-device bug event.

24. A non-transitory machine readable medium storing a program for reporting potential bug events in an ecosystem with first and second devices, the program for execution by at least one processing unit of the first device, the program comprising sets of instructions for:
   detecting a potential bug event; and
   directing the second device to gather a collection of one or more data sets relating to a state of the second device, the collection of the one or more data sets for reporting to a set of servers that obtain collections of data sets from devices in order to analyze bug events.

25. The non-transitory machine readable medium of claim 24, wherein the program further comprises sets of instructions for:
   gathering, at the first device, another collection of one or more data sets relating to a first-device state pertaining to the potential bug event; and
   providing the other collection of the one or more data sets to the set of servers to associate with the collection of data sets obtained from the second device, in order to analyze the detected potential bug event.

26. The non-transitory machine readable medium of claim 24, wherein the program further comprises a sets of instructions for providing, from the first device, an identifier to identify the potential bug event, said identifier for the second device to use to associate the collection of data sets to the potential bug event.

27. The non-transitory machine readable medium of claim 26, wherein the program further comprises a sets generating, at the first device, the identifier as a unique identifier that is associated with the potential bug event.

28. A device comprising:
   a memory; and
   at least one processor configured to:
   receive, from another device, a command to gather a collection of one or more data sets relating to a state of the device,
   wherein the command is received responsive to a potential bug event being detected by the other device; and
   transmit the collection of one or more data sets to a set of servers that obtain collections of data sets from devices in order to analyze bug events.

29. The device of claim 28, wherein the at least one processor is further configured to:
   receive, from the other device, an identifier to identify the potential bug event; and
   associate the identifier with the collection of one or more data sets.

30. The device of claim 28, wherein the device and the other device perform at least one task by communicating with each other through a communication network, wherein the detected potential bug event relates to the task.

31. The device of claim 28, wherein the collection of one or more data sets are transmitted the set of servers responsive to receipt of a request therefor from the set of servers.

32. The device of claim 28, wherein the device and the other device are two different types of devices, and the different types of devices comprising a smartphone, a smart watch, a tablet, a computer, or a media streaming device.

33. The device of claim 28, wherein the command further comprises a command to gather and report the collection of one or more data sets relating to the state of the device.

* * * * *